United States Patent
Bamba

(10) Patent No.: US 7,983,149 B2
(45) Date of Patent: Jul. 19, 2011

(54) LINE ACCOMMODATION DEVICE AND CONTROL METHOD THEREOF

(75) Inventor: Masakazu Bamba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1258 days.

(21) Appl. No.: 11/169,684

(22) Filed: Jun. 30, 2005

(65) Prior Publication Data

US 2006/0221814 A1 Oct. 5, 2006

(30) Foreign Application Priority Data

Mar. 30, 2005 (JP) ................. 2005-100056

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)

(52) U.S. Cl. ...................... 370/217; 370/400

(58) Field of Classification Search .......... 370/217–224, 370/400–405
See application file for complete search history.

(56) References Cited

U.S. PATENT DOCUMENTS

| 6,999,411 | B1 * | 2/2006 | Brewer et al. | 370/220 |
| 7,403,473 | B1 * | 7/2008 | Mehrvar et al. | 370/217 |
| 7,545,735 | B1 * | 6/2009 | Shabtay et al. | 370/217 |
| 2004/0151172 | A1 * | 8/2004 | Notani et al. | 370/380 |
| 2004/0208554 | A1 * | 10/2004 | Wakai et al. | 398/54 |

FOREIGN PATENT DOCUMENTS

JP 2004-236205 8/2004

* cited by examiner

*Primary Examiner* — Xavier Szewai Wong
(74) *Attorney, Agent, or Firm* — Fujitsu Patent Center

(57) ABSTRACT

The present invention provides a line accommodation device comprising at least one first communication control unit for controlling information transmission/reception to/from a first communication system, at least one second communication control unit for controlling information transmission/reception to/from a second communication system using the first communication system as a communication medium and a route control unit for controlling the switching of an information transfer route between the first and second communication unit.

14 Claims, 26 Drawing Sheets

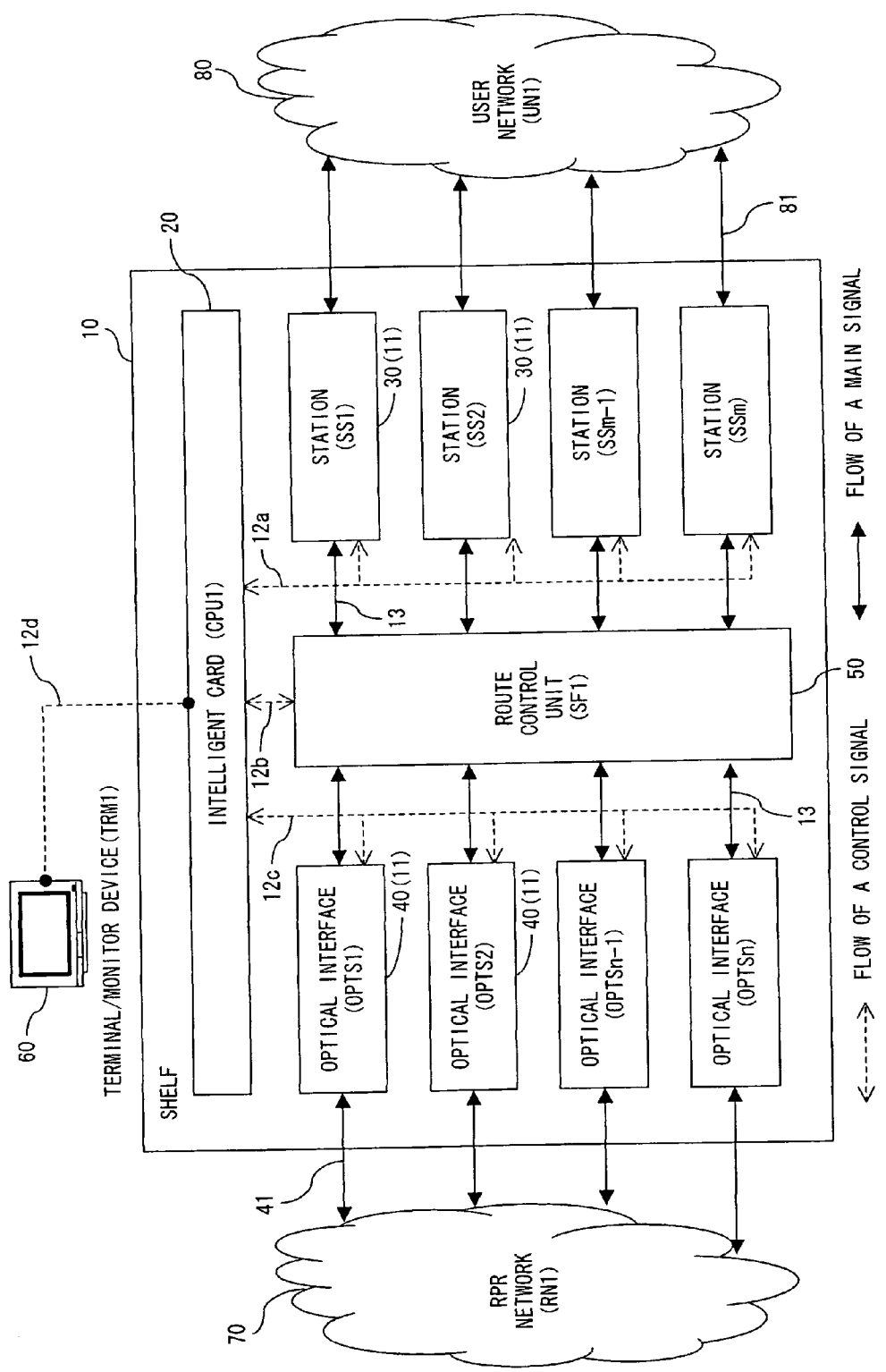

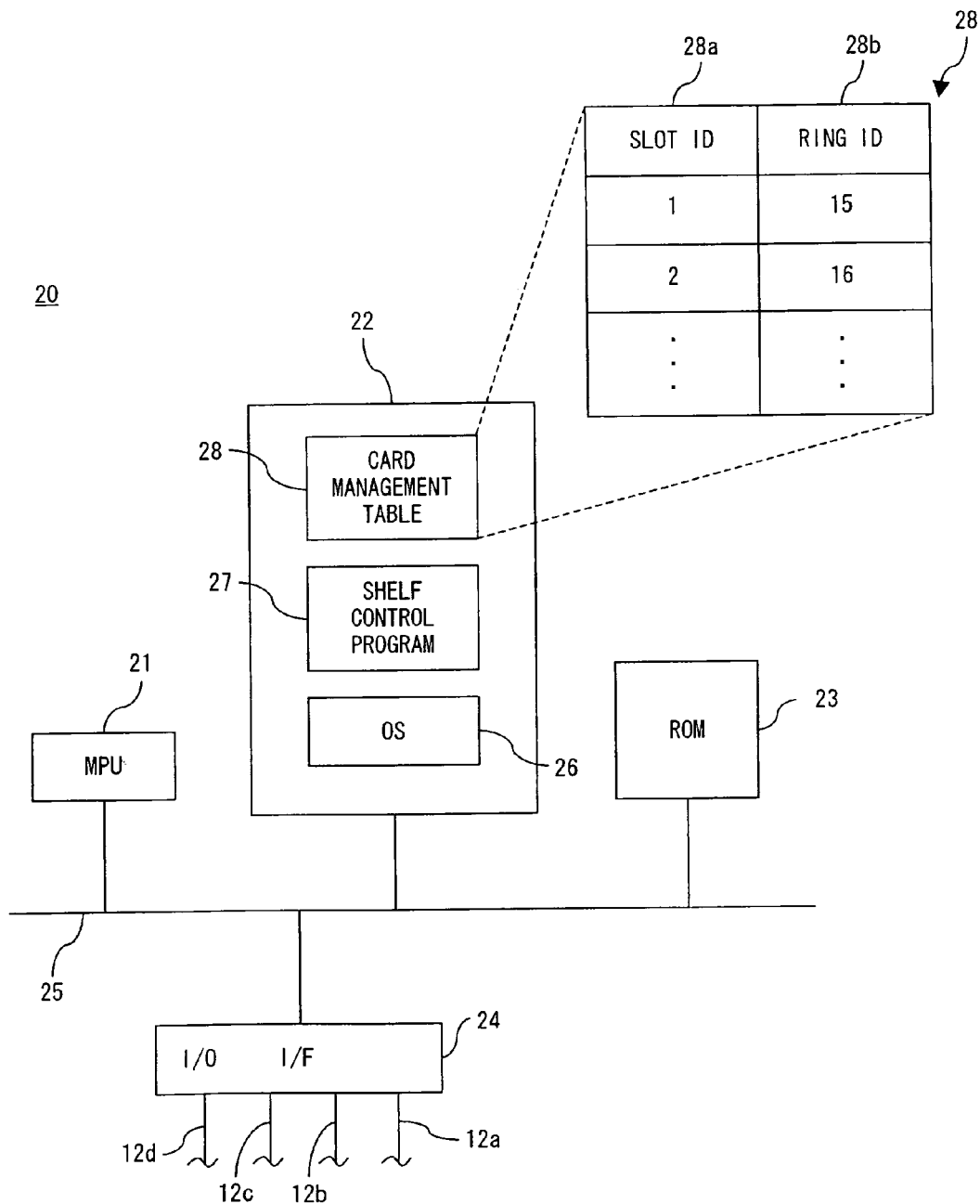
F I G. 2

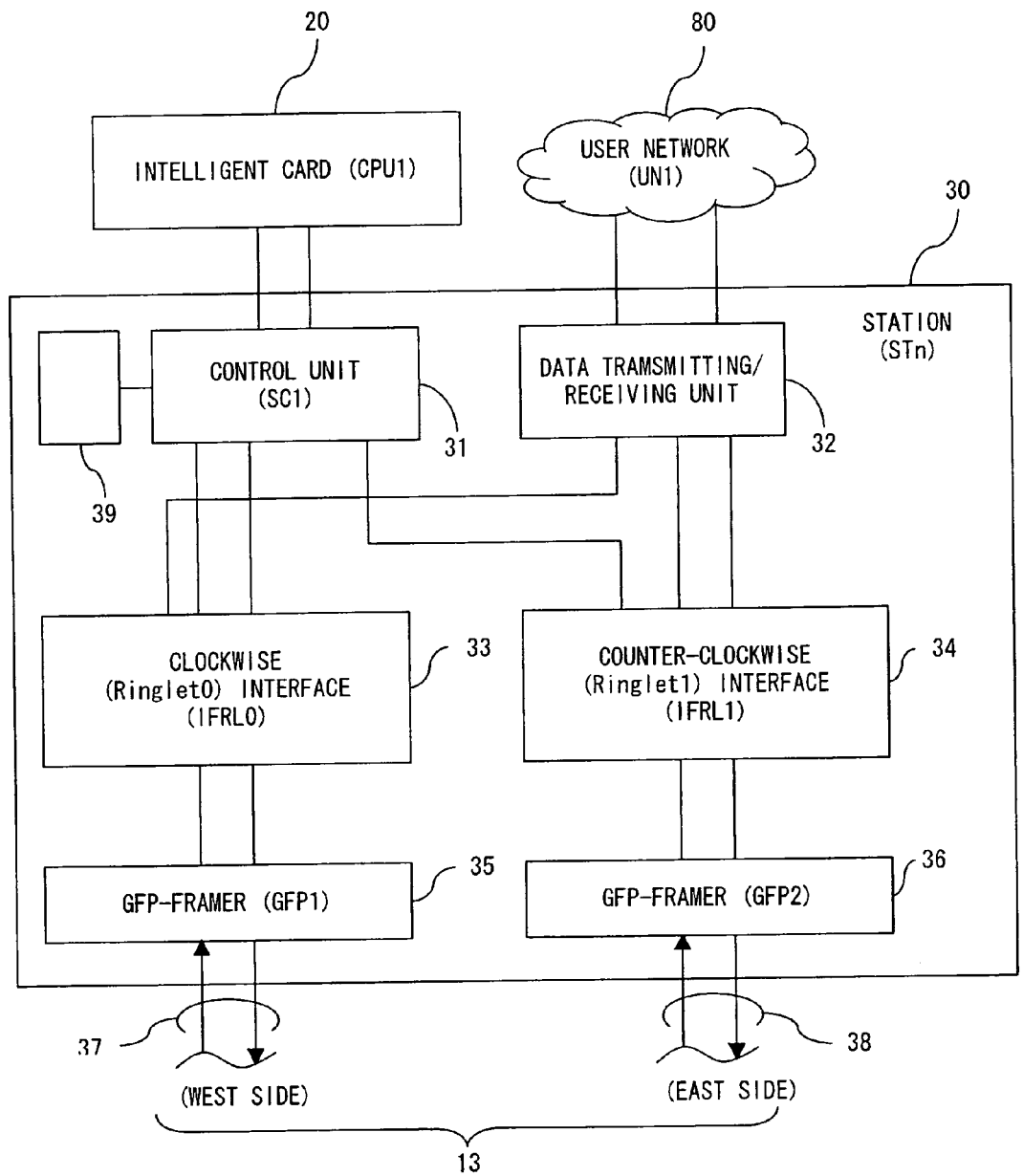
F I G. 3

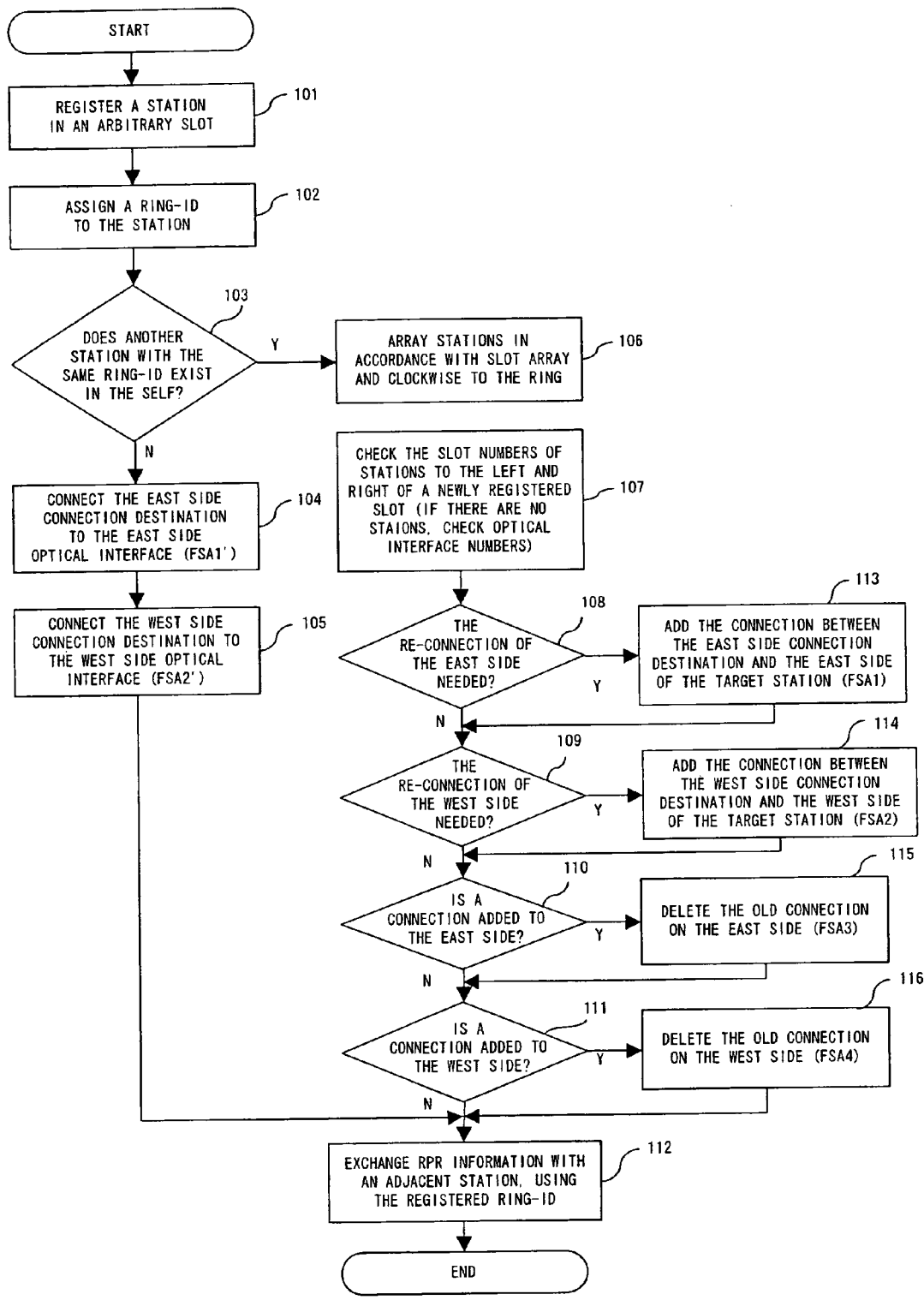
F I G. 5

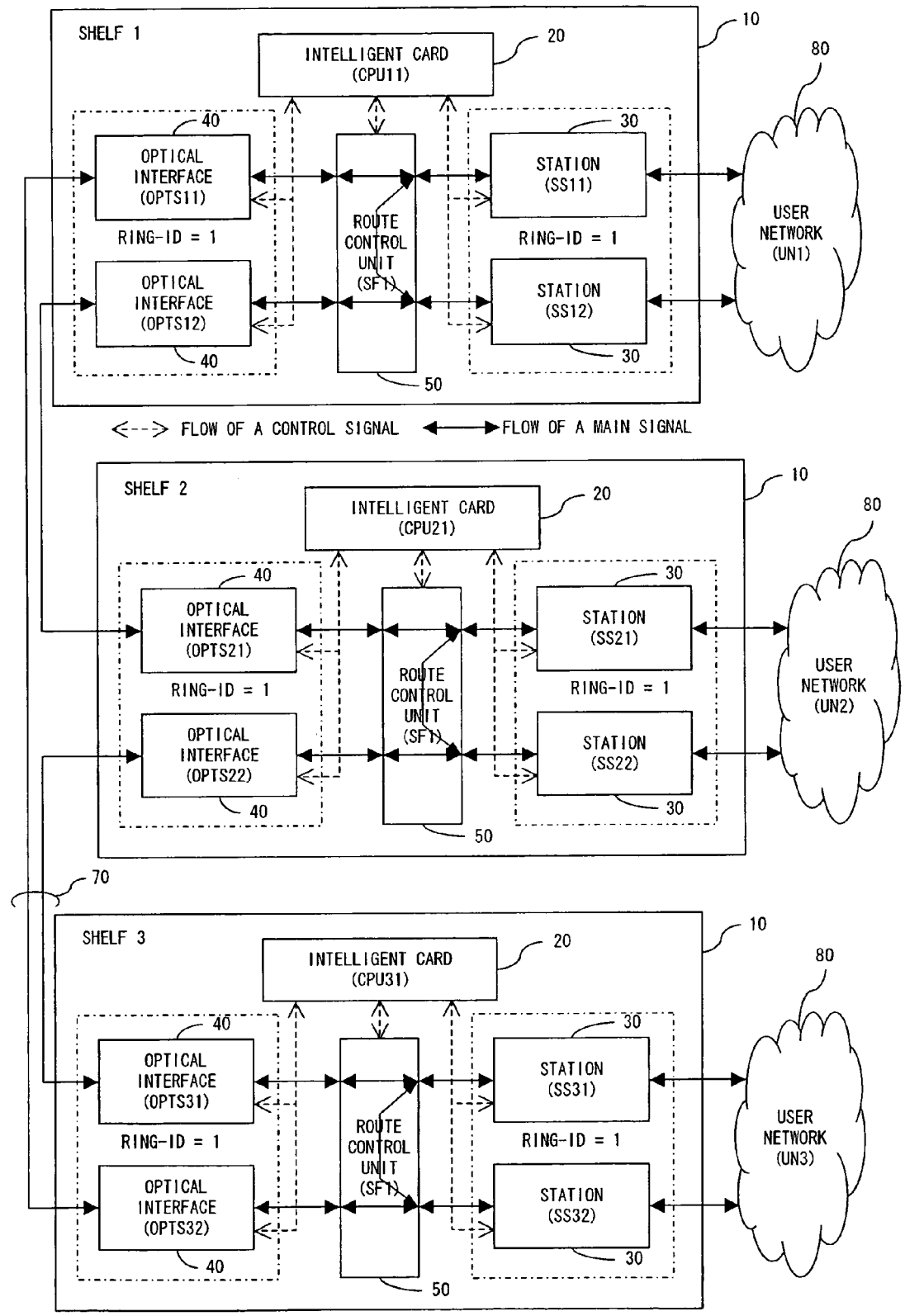
F I G. 14

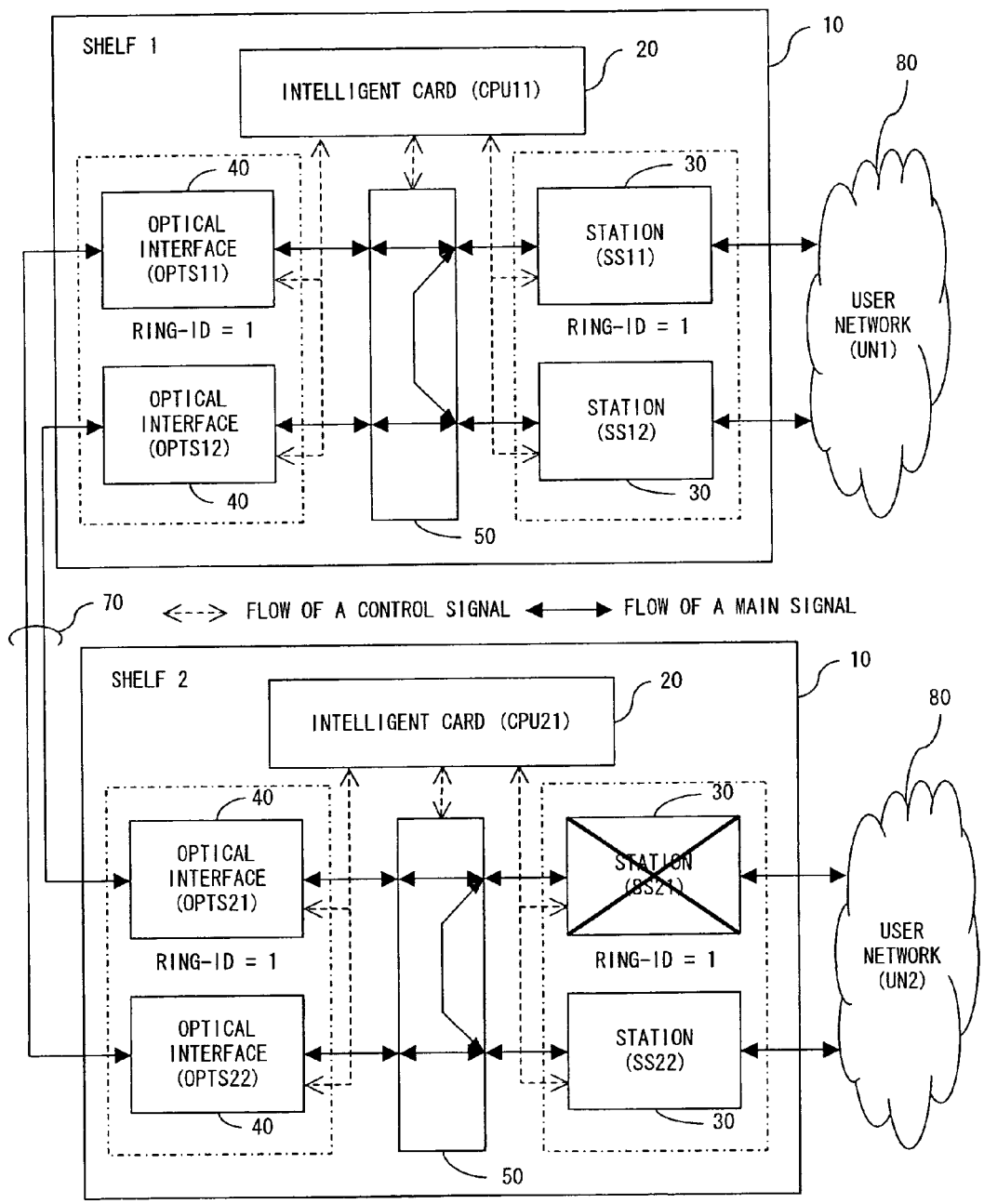
F I G. 1 8

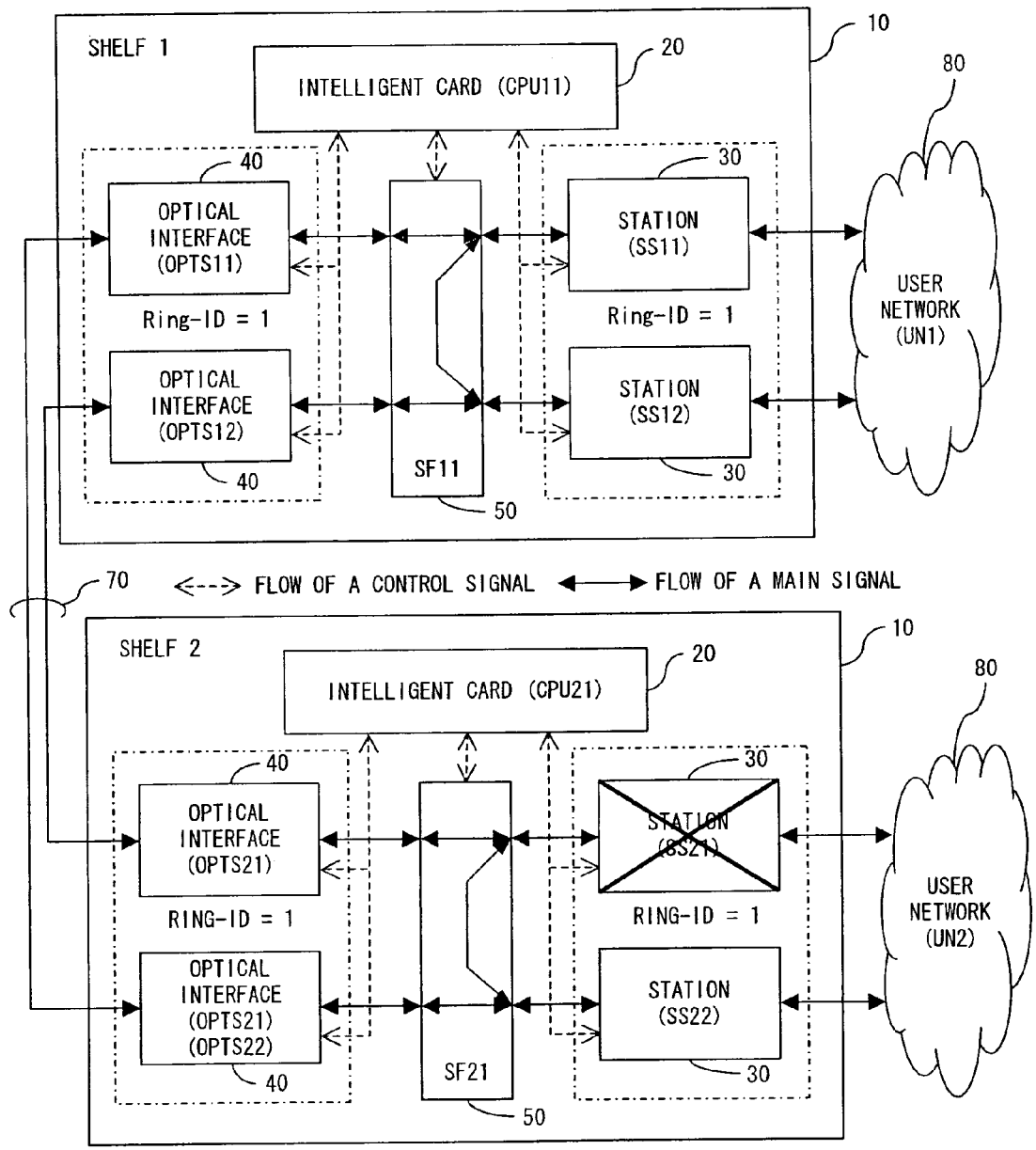
F I G. 1 9

BEFORE DISCONNECTION, THE LINE IS SWITCHED IN SUCH A WAY THAT SIGNALS MAY PASS THROUGH PT1

PT2 IS ESTABLISHED AND DISCONNECTION IS MADE IN SUCH A WAY THAT SIGNALS MAY PASS THROUGH PT2 HOWEVER, PT1 IS NOT DELETED.

BY CONNECTING-BACK, THE LINE SETTING IS MODIFIED IN SUCH A WAY THAT SIGNALS MAY PASS THROUGH PT1

| SA | DA | Freeze |
|---|---|---|
| a21a | a1e | NO |
| a1e | a21a | NO |
| a1w | a2e | NO |
| a2e | a1w | NO |
| a2w | a22a | NO |
| a22a | a2w | NO |

ROUTING TABLE BEFORE DISCONNECTING

FIG. 22A

|  | 53a | 53b | 53c | 53 |
|---|---|---|---|---|
|  | SA | DA | Freeze |  |
| MODIFICATION | a21a | a1e | YES |  |
| MODIFICATION | a1e | a21a | YES |  |
| MODIFICATION | a1w | a2e | YES |  |
| MODIFICATION | a2e | a1w | YES |  |
| ADDITION | a21a | a2e | NO |  |
| ADDITION | a2e | a21a | NO |  |
|  | a2w | a22a | NO |  |
|  | a22a | a2w | NO |  |

ROUTING TABLE DURING DISCONNECTING

FIG. 22B

| | 53a | | 53b | | 53c |
|---|---|---|---|---|---|
| | SA | | DA | | Freeze |
| | a21a | | a1e | | NO |
| | a1e | | a21a | | NO |
| | a1w | | a2e | | NO |
| | a2e | | a1w | | NO |
| | a2w | | a22a | | NO |
| | a22a | | a2w | | NO |

ROUTING TABLE AFTER RECONNECTING

F I G. 2 2 C

LINE ACCOMMODATION DEVICE AND CONTROL METHOD THEREOF

BACKGROUND OF THE INVENTION

1. Field of the Invention

The present invention relates to a line accommodation device, a control method and a control program thereof, and more particularly relates to a technology effective when applying them to a line accommodation technology for collecting a plurality of communication system stations and communication nodes or the like.

2. Description of the Related Art

In order to stably transmit/receive frames in many data network, networks utilizing a failure relief function possessed by a communication system, such as a synchronous optical network (SONET), a synchronous digital hierarchy (SDH), a wavelength division multiplexing (WDM) and the like are designed. In such a situation, a rating for realizing a failure relief function at a frame level while using SONET as a communication medium is the resilient packet ring (RPR). Thanks to the RPR rating, there becomes no need to build a redundancy configuration in order to relieve failures in SONET, SDH and WDM.

However, SONET or the like is still used as a communication medium, a network, such as SONET or the like must be built before an RPR is used.

As the prior art, there is IEEE 802.17 (RPR rating). In this rating, the detailed building method of an RPR network is not especially referred to. As indicated in the rating, in an RPR, it is important for RPR stations (hereinafter called "station") are connected via two ring-shaped information transmission lines (ringlet) for transmitting information in mutually opposite directions. However, no attention is paid to how the stations are connected when SONET is used as a communication medium.

Judging from the disclosed contents of the rating, each station comprises one set of SONET interfaces (the combination of a clockwise SONET interface (SO1) and a counter-clockwise SONET interface (SO2)). If a station comprises a SONET interface, it is anticipated that a plurality of stations or a plurality of SONET interfaces is added/deleted to/from a line accommodation device accommodating the station (hereinafter called "shelf"). However, the configuration modification caused in such a shelf is not referred to.

Generally, a communication device capable of providing a large capacity of line services, such as a router, a transmission device or the like adopts a shelf structure. In this case, it is preferable to embody each communication service (such as a station, a SONET interface, etc,) in the form of a card (substrate) and to be able to freely insert/remove this card in/from the shelf.

If the RPR function is applied for such a usage, the contents disclosed of the above-mentioned rating is incomplete as it is. Particularly, a network must be built paying attention to the following points.
(1) Disposing stations in a ring shape
(2) Connecting a SONET interface in such a way not as to avoid wrong the East/West directions for a ring
(3) Carefully connecting an optical fiber to a target ring if a plurality of RPRs is collected in the shelf These setting (1) through (3) must be made for each station. As the combination of stations, not only the combination of stations in a shelf but also the combination of stations across a plurality of shelves are anticipated. In any case, attention must be paid so as to avoid a wrong connection.

In the RPR rating, the following alarms are issued if there is a wrong connection.
(1) Mis-cable
(2) Mis-cable connection
(3) Keep-alive timeout
(4) A regular report cannot be received from an adjacent station However, these are not caused as long as there is no hardware failure, such as the wrong connection of east/west cables, a station failure or the like. Therefore, a method for detecting that a station is connected to an unintended RPR is not defined.

As to the failure relief of an RPR, if a station fails, it is clearly specified in the rating that the station should be disconnected. As the removal method, the steering/wrapping of the RPR is simply used. Therefore, when the station is broken and when the layer of a SONET, a SDH and a WDM fails, they are similarly relieved. In other words, even when a station is broken, the steering/wrapping of an RPR occurs.

Therefore, a network in which the RPR steering/wrapping occurs due to the failure of a station cannot activate a new RPR steering/wrapping until the station recovers from the failure. During this period, redundancy continues to be lost. In an RPR in which the length of one ring is assumed to be 2,000 km, there is a possibility that stations may be scattered a long distance away from each other. Therefore, it is not easy to switch the broken station. In this case, it takes a long time to recover the redundancy, that is, reliability of the station.

The above-mentioned problems of the prior art can be summarized as follows.
(1) The addition of a station to an arbitrary ring is not assured.
(2) The deletion of a station from an arbitrary ring is not assured.
(3) The connection of stations to the same ring across a plurality of shelves is not assured.
(4) When a station is broken, the station can be disconnected from the ring by RPR steering/wrapping. However, if another failure occurs by the influence, failure relief by RPR steering/wrapping cannot be realized.

Patent reference 1 discloses a transmission device for independently performing ring switching at a SONET/SDH network level and ring switching at a network level, such as an RPR or the like by providing a network signal processing means for switching a ring for each network signal using a synchronous signal obtained from a connection means connected to the SONET/SDH network. However, it does not recognize the above-mentioned technical problem in the case where a plurality of stations or SONET interfaces is installed in one shelf.

Patent reference 1: Japanese Patent Application No. 2004-23620

SUMMARY OF THE INVENTION

It is an object of the present invention to provide a technology capable of surely adding/deleting a second communication control means in a line accommodation device for accommodating the second communication control means connected to a second communication system using a first communication system as a medium.

It is another object of the present invention to provide a technology capable of assuring the accurate operation of a plurality of second communication control means belonging to each of a plurality of second communication systems in a line accommodation device for accommodating the second communication control means connected to a second communication system using a first communication system as a medium.

It is another object of the present invention to provide a technology capable of realizing the failure countermeasures of a second communication control means connected to a second communication system without degrading anti-failure function of the second communication system in a line accommodation device for accommodating the second communication control means connected to a second communication system using a first communication system as a medium.

The first aspect of the present invention is a line accommodation device. The line accommodation device comprises at least one first communication control unit for controlling the information transmission/reception to/from a first communication system, at least one second communication control unit for controlling the information transmission/reception to/from a second communication system using the first communication system as a communication medium and a route control unit for controlling the switching of an information transfer route between the first and second communication control unit.

The second aspect of the present invention is the control method of a line accommodation device comprising a first communication control unit for controlling the information transmission/reception to/from a first communication system and a second communication control unit for controlling the information transmission/reception to/from a second communication system using the first communication system as a communication medium. The control method comprises a first step of building the second communication system by connecting the first and second communication control unit via a route control unit for controlling the switching an information transfer route between the first and second communication control unit; and a second step of modifying the information transfer route when extending or removing the first and/or second communication control unit.

The third aspect of the present invention is a signal for carrying the control program of a configuration control device provided for a line accommodation device comprising a first communication control unit for controlling the information transmission/reception to/from a first communication system, a second communication control unit for controlling the information transmission/reception to/from a second communication system using the first communication system as a communication medium and a route control unit for controlling the switching of an information transfer route between the first and second communication control unit. The control program enables the configuration control device to realize: a function of enabling the route control unit to set the information transfer route for bypassing the failed second communication control unit when the second communication control unit fails or when it is disconnected from the line accommodation device; and a function of determining the adding position of the second communication control unit in the second communication system when adding the second communication control unit to the arbitrary second communication system.

The fourth aspect of the present invention is a signal for carrying a control program for controlling a second communication control unit in a line accommodation device comprising a first communication control unit for controlling the information transmission/reception to/from a first communication system, the second communication control unit for controlling the information transmission/reception to/from a second communication system using the first communication system as a communication medium and a route control unit for controlling the switching of an information transfer route between the first and second communication control unit. The control program enables the second communication control unit to realize: a function of adding identifying information to communication information transmitted to the second communication system; a function of detecting the identifying information added to the communication information; and a function of identifying each of the second communication systems, using the identifying information.

More specifically, since the RPR rating has no concept of registering a plurality of RPRs in one shelf (line accommodation device) or a plurality of stations (RPR station: the second communication control means) for example, when using a SONET/SDH as the first communication system and building an RPR in this SONET/SDH as the second communication system, the above-mentioned technical problems occur. In order to solve these problems, for example, the following methods are used.

Firstly, if a shelf accommodates a plurality of SDH interfaces and stations and the stations individually belong to the plurality of RPRs, a ring identification being a Ring-ID is attached to each RPR and RPRs related to the shelf are identified.

Secondly, the shelf comprises control logic for determining which SDH interface or station in the shelf should be connected according to a RING-ID. The control logic for this determination is executed by an intelligent card (configuration control means) provided in the shelf. An SDH interface or a station is connected according to the determination result without exchanging a line (frame). A shelf accommodating only one RPR needs no RING-ID.

Thirdly, a station comprises control logic for identifying each RPR by applying a RING-ID to a frame flowing through an RPR network in inter-station communication. Even when an RPR is connected across shelves in this way, stations in each shelf can surely prevent a failure, such as interference between different RPRs or the like by issuing an alarm, based on the Mismatch of the RING-ID, canceling the frame or the like if the frame is from an RPR with an expected RING-ID.

Fourthly, the array of stations belonging to each RPR can be managed in each shelf by using a RING-ID. When a failure occurs in each station or a service cannot be provided by removing a station from a shelf in this way, the station can be disconnected from the RPR by modifying the array of stations. In this case, since a station is not disconnected by an RPR function, the failure relief function of the RPR is not damaged, and accordingly, even when a failure occurs later, relief by the steering/wrapping function is possible.

As described above, in the present invention, for example, when building an RPR function using a SONET network, the RPR can be more simply used than the conventional method. Alternatively, it can be more easily used than the conventional method by adding a relief function which can be performed at a shelf level.

For example, in order to build an RPR network being the second communication system on a SONET being the first communication system, a plurality of station functions (the second communication control means) of the RPR network and two optical interfaces for SONET connection (the first communication control means) are needed. Since the number of stations in the RPR network is rated to be 255, 255 supports are needed in the RPR network. An arbitrary number of them can be used to build the RPR network. Each of the two optical interfaces takes charge of the East or West side.

The shelf comprises a station card for providing an RPR function, an optical interface card for connecting shelves and a line switching card or frame switching card (route control means) for connecting station cards or an optical interface card to a station card.

In order to build an RPR network, it becomes necessary to dispose a plurality of shelves on the RPR network. For that purpose, it is necessary to build a ring-shaped transmission line by connecting the shelves using an optical interface.

If a configuration for providing the function of an RPR network can be secured when building an RPR network using a plurality of shelves, each shelf can also support a plurality of RPR networks. In this case, in order to provide an RPR function, each RPR network requires one station card and two optical interfaces.

If a plurality of these configurations can be set in a shelf, one shelf can accommodate a plurality of RPR networks. In this case, the present invention can accommodate an arbitrary number of RPR networks in the shelf, using an identifier being a RING-ID.

In the function to automatically add/delete a station to a shelf, a RING-ID is needed to identify a target RPR network. If one shelf accommodate only one RPR network and a station is added/deleted, the present invention can be applied without any special RING-ID.

When adding a station, by also registering the RING-ID in the station, the intelligent card (configuration control means) in the shelf calculates the adding position (topology) of the station in the RPR network and modifies the design of the line switching method so as to connect the station to the RPR network. If the route control means performs frame switching, it modifies the frame switching setting. In this case, the setting is automatically modified according to a specific rule even if there is no instruction (such as an input from an operator) from a monitor device or a terminal to which the intelligent card is connected.

As in the case of station adding, a station can be deleted (disconnected) by modifying the connection setting of the route control means using an intelligent card.

In order to minimize the influence on the RPR network during the setting modification, in the case of the line switching method, a path-switch function is utilized. The path-switch function means to switch inputs from two directions by the switching operation of a receiving unit. Since using this function, a line to be used can be modified simply by throwing down a switch to the opposite direction after setting the line, the inputs can be instantaneously (such as within 50 milliseconds) switched. For example, if only one line is usually set, firstly, one line is added when additional operation is activated and the total number of lines becomes two. Then, a connection route can be switched by operating a path-switch to pass signals through the added line.

If the route control means adopts the frame switching method instead of the line switching method, the present invention modifies a route through which frames pass by adding specifying information to a routing table. In this case, when adding/deleting a line, valid/invalid information is attached in order to instantaneously modify the table instead of rewriting the table. If valid/invalid information is used, no mis-operation occurs even when a source address (SA) or a destination address (DA) is overlapped and registered in the routing table.

In order to determine the RPR network connection order of stations in the intelligent card, it is necessary to make a rule determining in what order stations should be registered in the RPR network. If this rule exists, according to the rule, it can be calculated in what position of the RPR network with the same RING-ID the station should be added. When deleting a station, it can be detected how the remaining stations should be connected after deleting it.

The present invention prepares an intelligent card in order to control the inside of a shelf. This intelligent card can also receive instructions from the outside, and set, for example, a RING-ID or the like in each card of the shelf according to the instructions of the operator. If a plurality of RING-IDs is supported, a RING-ID to use the shelf can be freely set by the instructions of the operator. Since the intelligent card can also calculate, it can collect alarms and statistic information from an optical interface card, a station card and the route control means and can also notify the operator or the monitor device of them.

A RING-ID can also be used when stations are accommodated across shelves, besides for the connection in the shelf. In this case, a RING-ID is set in a part of a specific RPR frame and it is transmitted to a station in an adjacent shelf. By comparing a RING-ID contained in the RPR frame with its own RING-ID in the station, the validity of a received frame can be determined. If they are the same, it can be determined that they are normal. If they are different, they are determined to be abnormal and a necessary process can be performed.

If an unexpected RING-ID is received from the adjacent station, it is detected that an unexpected station exists in the RPR network. In this case, a function to alarm against the fact if the RING-ID is not expected, is provided and the operator is urged to check the stations in the RPR network.

Furthermore, if it is desired that not only an alarm is issued but communication signals are also disconnected when an unexpected station exists in the RPR network, they can also be disconnected by the setting of the operator. In this way, data belonging to a specific RPR network can be prevented to leak to an unexpected RPR network due to the mis-connection of the optical fiber.

The RPR uses switching logic provided by the RPR function not only when signals are not transmitted due to the disconnection or failure of an optical fiber but also when the station fails. In the present invention, if a station falls in the state where the RPR function cannot be clearly provided due to the failure of the station or the like, the station is disconnected by controlling the route control means. Therefore, logic for detecting that a station falls in the state where the RPR function cannot be provided is installed in the intelligent card.

If a station falls in an abnormal state (such as failure, etc.), the station is disconnected from the RPR network and is re-disposed in a ring shape. The re-disposition is performed by controlling the route control means. In this case, an intelligent card that detects abnormality re-calculates the topology in another station which can avoid the station and sets a bypassing circuit for disconnecting it in the route control means.

BRIEF DESCRIPTION OF THE DRAWINGS

FIG. 1 shows an example of the configuration of the line accommodation device in the one preferred embodiment of the present invention.

FIG. 2 shows the detailed configuration of a part of the line accommodation device in the one preferred embodiment of the present invention.

FIG. 3 shows the detailed configuration of a part of the line accommodation device in the one preferred embodiment of the present invention.

FIG. 5 shows the function of the line accommodation device in the one preferred embodiment of the present invention.

FIG. 14 shows the function of an information network including the line accommodation device in the one preferred embodiment of the present invention.

FIG. 18 shows the function of an information network including the line accommodation device in the one preferred embodiment of the present invention.

FIG. 19 shows the function of an information network including the line accommodation device in the one preferred embodiment of the present invention.

FIG. 22A shows the routing table used for route control by the frame switching method in the one preferred embodiment of the present invention.

FIG. 22B shows the routing table used for route control by the frame switching method in the one preferred embodiment of the present invention.

FIG. 22C shows the routing table used for route control by the frame switching method in the one preferred embodiment of the present invention.

DESCRIPTION OF THE PREFERRED EMBODIMENTS

Figure 4:
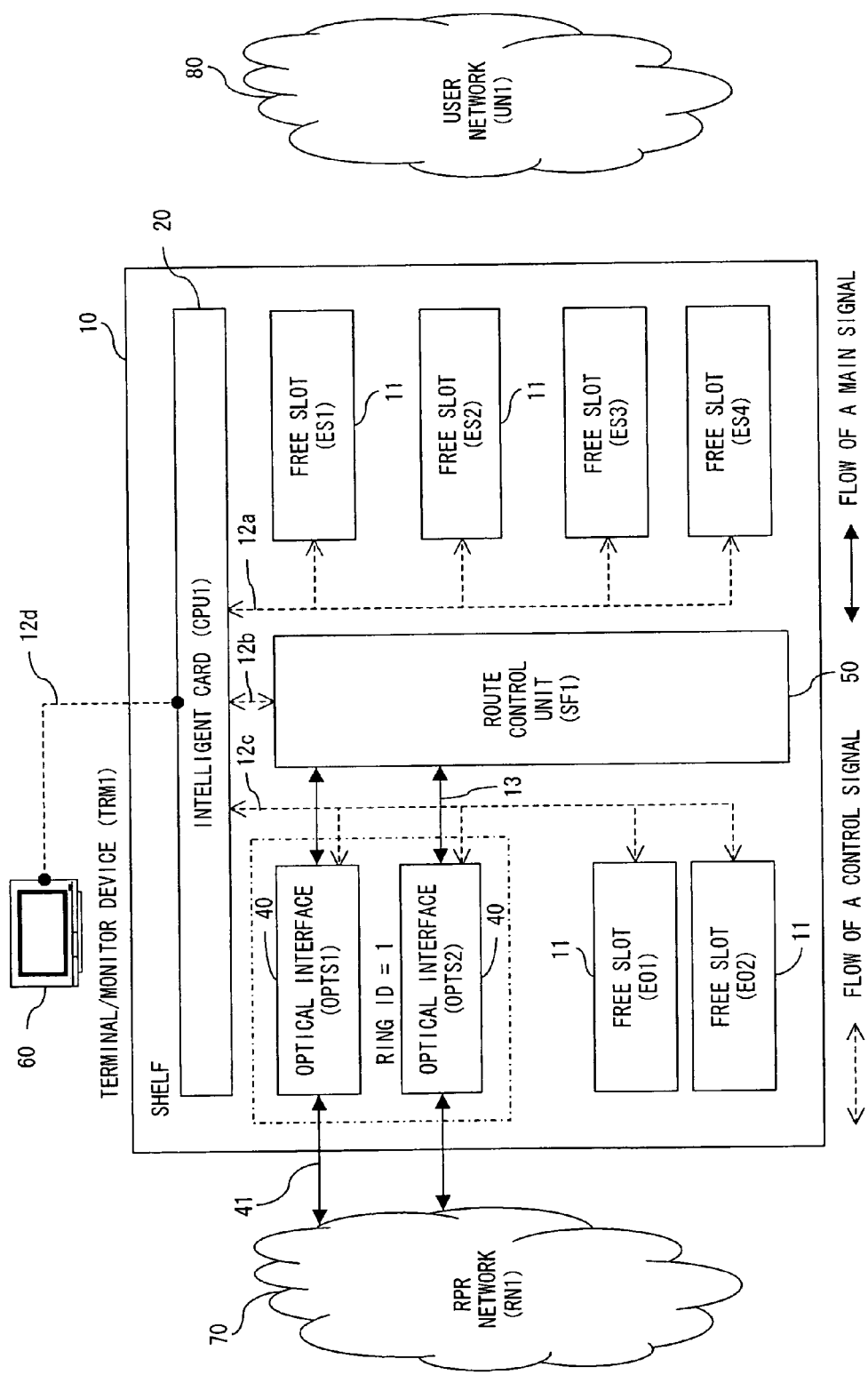
FIG. 4 shows the functions of the line accommodation device in the one preferred embodiment of the present invention.

The preferred embodiments of the present invention are described in detail below with reference to the drawings.

FIG. 1 shows an example of the configuration of the line accommodation device in the one preferred embodiment of the present invention. FIGS. 2 and 3 show the detailed configuration of a part of the line accommodation device in the one preferred embodiment of the present invention.

As shown in FIG. 1, the shelf (line accommodation device) 10 of this preferred embodiment comprises an intelligent card (configuration control unit) 20, a plurality of slots 11, a route control unit (route control unit) 50.

The slot 11 comprises a station (the second communication control unit) 30 and an optical interface (the first communication control unit) 40 which are attachable/detachable. The station 30 constitutes the communication node (RPR station) of an RPR (the second communication system) using an optical communication system (the first communication system), such as a SONET or the like, as a communication medium.

The optical interface 40 provides an interface connecting an optical communication system, such as a SONET or the like, and the station 30.

The route control unit 50 controls an information transfer route between the station 30 and optical interface 40 which are installed in each slot 11. This route control unit 50 can adopt either a line switching method or a frame switching method, as described later.

FIG. 2 shows an example of the configuration of the intelligent card 20.

The intelligent card 20 of this preferred embodiment comprises a microprocessor unit (MPU) 21, main memory 22, ROM 23, an input/output interface 24 and a bus 25.

The main memory 22 stores information, such as an operating system 26, a shelf control program 27, a card management table 28 and the like.

The MPU 21 manages the entire shelf 10, as exemplified in the flowchart described later, by executing the operating system 26 and shelf control program 27 which are stored in the main memory 22. The card management table 28 is used to execute the shelf control program.

The ROM 23 is composed of re-writable non-volatile storage medium and stores information, such as the operating system 26, shelf control program 27, card management table 28 and the like. When the intelligent card 20 is activated, the information is loaded from the ROM 23 to the main memory 22.

The input/output interface 24 transmits/receives information to/from an external device via control signal lines 12a, 12b, 12c and 12d.

Specifically, the input/output interface 24 is connected to the station 30, the route control unit 50 and the optical interface 40 via the control signal lines 12a, 12b and 12c.

The card management table 28 stores a slot ID 28a and a Ring-ID 28b, which are related. The slot ID 28a is identifying information uniquely attached to each of the plurality of slots 11. The Ring-ID 28b is a RING-ID for identifying the RPR network 70 to which the station 30 installed to the slot 11 belongs, which is described later.

FIG. 3 shows an example of the configuration of the station 30. The station 30 of this preferred embodiment comprises a control unit 31, a RING-ID storage unit 39, a data transmitting/receiving unit 32, a clockwise interface 33, a counter-clockwise interface 34, and generic framing procedure (GFP) framers 35 and 36.

The control unit 31 performs the protocol control of the RPR and further performs the entire control of the station 30 by controlling the clockwise and counter-clockwise interfaces 33 and 34 under the management of a higher-order intelligent card 20.

The data transmitting/receiving unit 32 controls the information transmission/reception between the station 30 and a user network 80, such as an external LAN or the like.

The clockwise interface 33 controls the information transmission/reception between a ringlet 37 (ringlet 0) constituting the RPR and the data transmitting/receiving unit 32.

The counter-clockwise interface 34 controls the information transmission/reception between a ringlet 38 (ringlet 1) constituting the RPR and the data transmitting/receiving unit 32.

The GFP framers 35 and 36 converts an RPR frame into a general frame and maps it on a SONET frame.

The RING-ID storage unit 39 stores RING-IDs attached to an RPR to which the station belongs. This RING-ID is provided by the intelligent card 20.

In the following description, the station 30 and optical interface 40 are referenced as an SSn and an OPTSn, respectively, as required (n: a natural number).

In the free slot 11 of the shelf 10, an optical interface 40 for connecting this station 30 to an RPR network 70 built on the SONET is installed, as necessary. The station 30 and optical interface 40 installed in the slot 11 can transmit/receive information via the route control unit 50.

Specifically, each of the station 30 and optical interface 40 installed in the slot 11 is connected to the route control unit 50 via a main signal line 13.

The optical interface 40 is connected to the SONET being the communication medium of the RPR network via an optical fiber 41.

The station 30 is connected to a user network 80 via a communication cable 81.

In this preferred embodiment, if a plurality of stations 30 installed in the shelf 10 is independently connected to different RPR networks 70, a unique Ring-ID 28b is attached to each RPR network 70.

The RING-ID is registered in the shelf 10 from a monitor device 60 to the intelligent card 20. In this case, the card management table 28 determines which optical interface 40 should be used by which RING-ID.

Specifically, in the slot ID 28a of the card management table 28, the identifying information of the station 30 or optical interface 40 installed in the slot 11 is set, and the RING-ID attached to the station 30 or optical interface 40 is set in the Ring-ID 28b.

Therefore, in each of the corresponding station 30 and optical interface 40, the same RING-ID is set.

In FIG. 4, the monitor device 60 sets a RING-ID "1" as an example. In this case, the optical interface 40 is registered in the RPR network using OPTS1 and OPTS2 for the east and west sides, respectively. When registering the RING-ID in the shelf 10, the slot position (slot ID 28a) of the optical interface 40 must be clear. However, there is no problem regardless of whether it is installed. There is also no problem even if the station 30 installed or if it is not under the control of the intelligent card 20.

If the station 30 is added to the shelf 10 after the RING-ID is registered, the intelligent card 20 controls the route control unit 50, according to the logic shown in the flowchart of FIG. 5.

When the intelligent card 20 automatically registers the station 30, the following two items become important.

(Item 1) The handling of the RING-ID for indicating the RPR network 70 to which the station 30 is added (Item 2) The disposing method in the shelf 10 of the station 30 belonging to the same RING-ID (RPR network 70)

As to item 1, since it is assumed that a plurality of RPRs is developed in the same shelf 10, it is needed to distinguish the RPRs. If only one RPR is handled, no RING-ID is needed. There is no problem even if RPRs are unconditionally added against the optical interface 40. Alternatively, the RING-ID can be provided with a default value (for example, RING-ID=0) so that the user of the RPR may not aware of the RING-ID (See flowchart in FIG. 6 mentioned below).

Since the essential purpose is to accommodate a plurality of RPRs in the same shelf 10, it is important to dispose stations 30 with the RING-ID according to a determined rule (the disposition rule in item 2). As the disposition rule of stations 30 in the shelf 10, the following three rules can be considered.

Rule A: Array the stations 30 in ascending order of the installed slot number.

Rule B: Array the stations 30 in clockwise order of the ring.

Rule C: Array the stations 30 in order connected to the RPR.

In this preferred embodiment, Rules A and B are used. Alternatively, rule C can be used.

By arraying the stations 30 in the shelf 10 according to a specific rule in this way, stations 30 with the same RING-ID can be added to the RPR simply by calculating their number in the intelligent card 20, without the help of the operator via the monitor device 60.

Specifically, the adding operation of the station 30 is described below with reference to FIGS. 5, 6, 7 and 8. When adding a station 30, firstly, the station 30 is registered in an arbitrary slot (step 101), and a RING-ID is assigned to the station 30 (step 102).

Then, it is determined whether another station 30 with the same RING-ID exists in the shelf 10 (step 103).

If it does not exist, the east side connection destination is connected to the east side optical interface 40 (FSA1') (step 104), and the west side connection destination is connected to the west side optical interface 40 (FSA2')(step 105).

Figure 7:
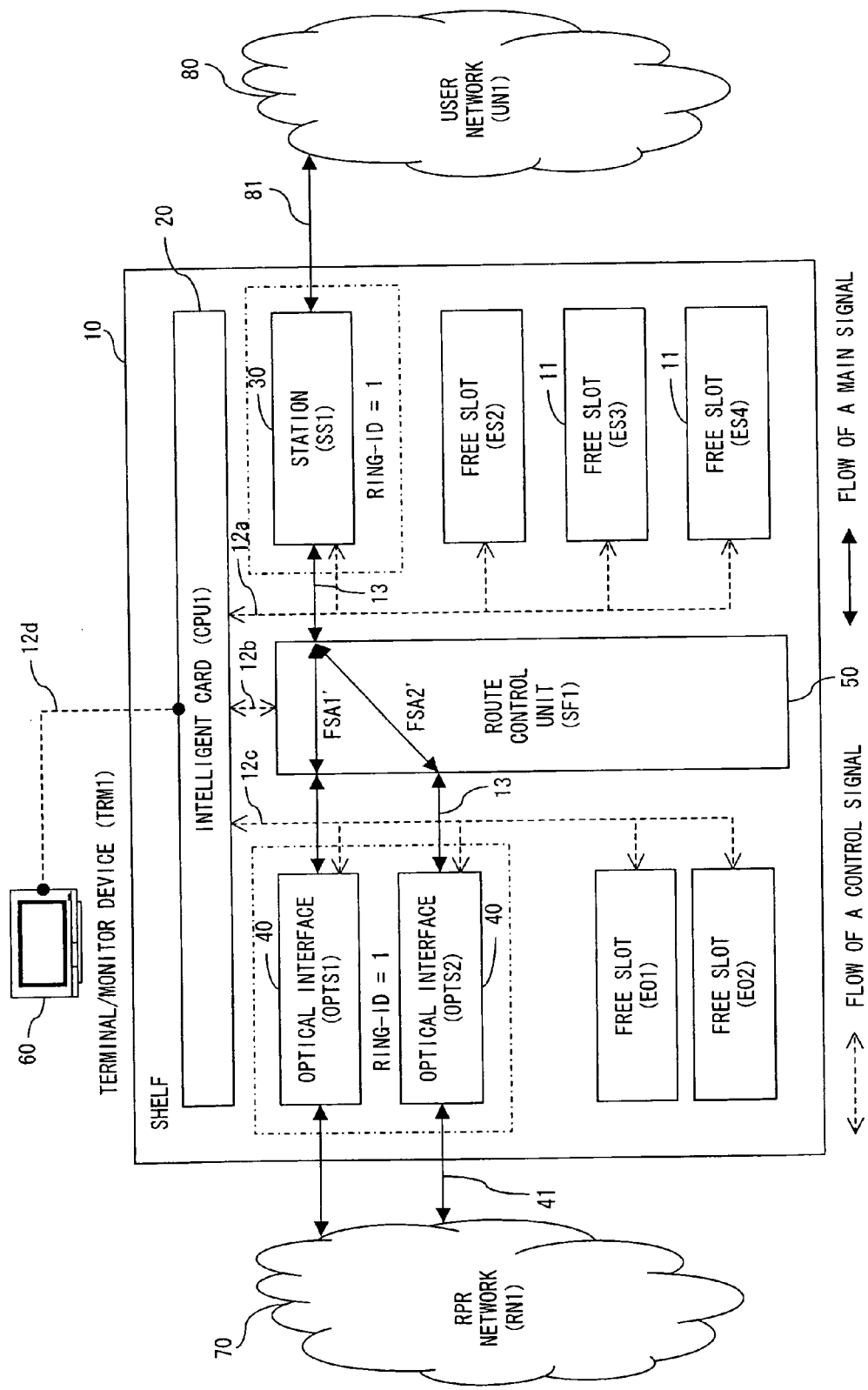
FIG. 7 shows the function of the line accommodation device in the one preferred embodiment of the present invention.

FIG. 7 shows the transition of the connection route in the route control unit 50 in steps 104 and 105.

If in step 103 it is determined that it exists, the array of the slot 11 is lined up clockwise to the RPR network 70 (step 106).

Then, the slot numbers of stations to the right and left of the newly registered slot 11 (provided with the station) are checked (if there is no station 30, the number of the optical interface 40 is checked) (step 107).

Then, it is determined whether the east side connection must be modified (step 108). If necessary, a connection between the east side connection destination and the east side of the target station 30 is added (FSA1) (step 113).

Furthermore, it is determined whether the west side connection must be modified (step 109) If necessary, a connection between the west side connection destination and the west side of the target station 30 is added (FSA2) (step 114).

Then, it is determined whether a connection is added to the east side (step 110). If it is added, the old connection on the east side is deleted (FSA3) (step 115).

Similarly, it is determined whether a connection is added to the west side (step 111). If it is added, the old connection on the west side is deleted (FSA4) (step 116).

Figure 8:
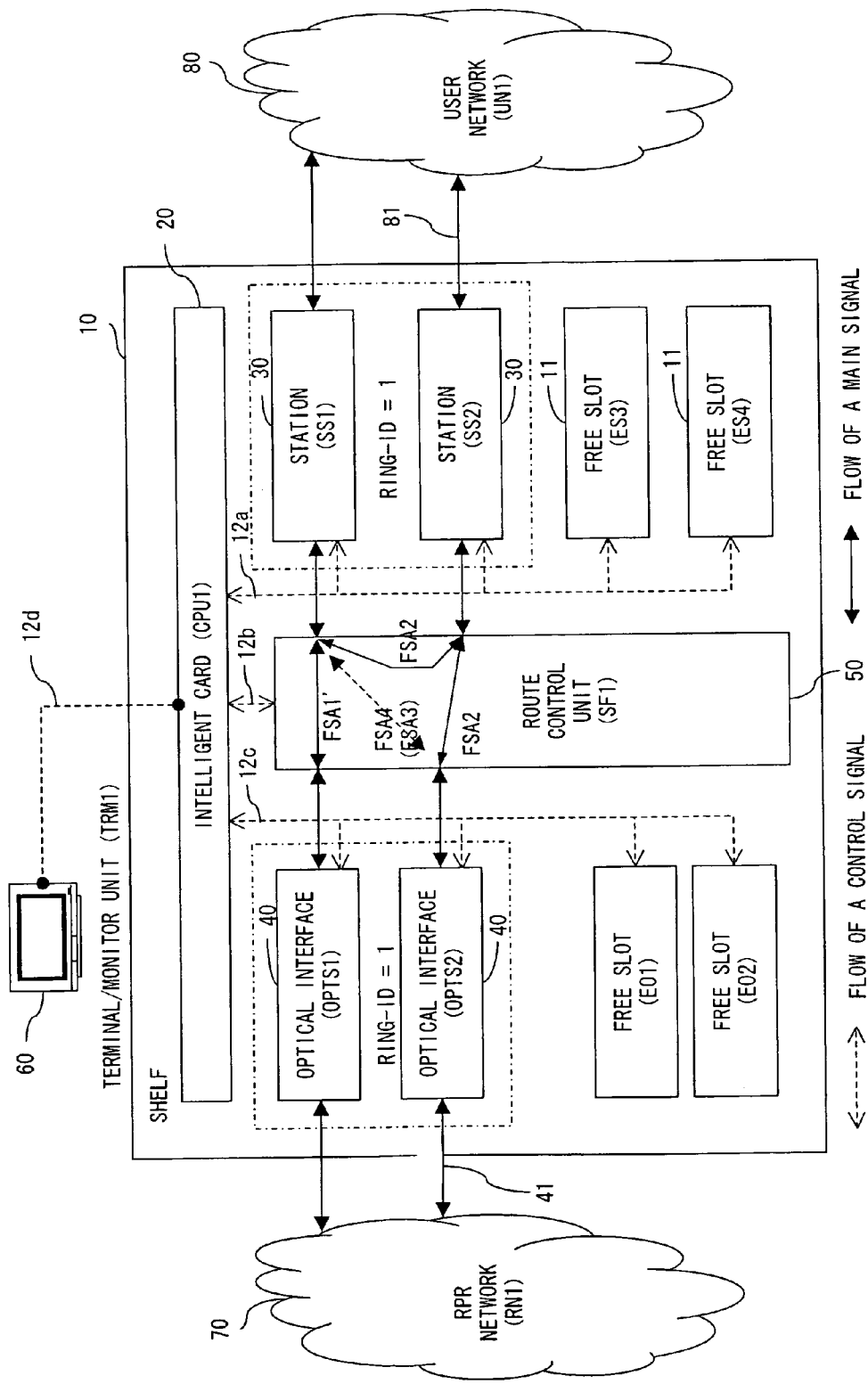
FIG. 8 shows the function of the line accommodation device in the one preferred embodiment of the present invention.

FIG. 8 shows the transition of the connection route in the route control unit 50 in steps 106 through 116.

Figure 9:
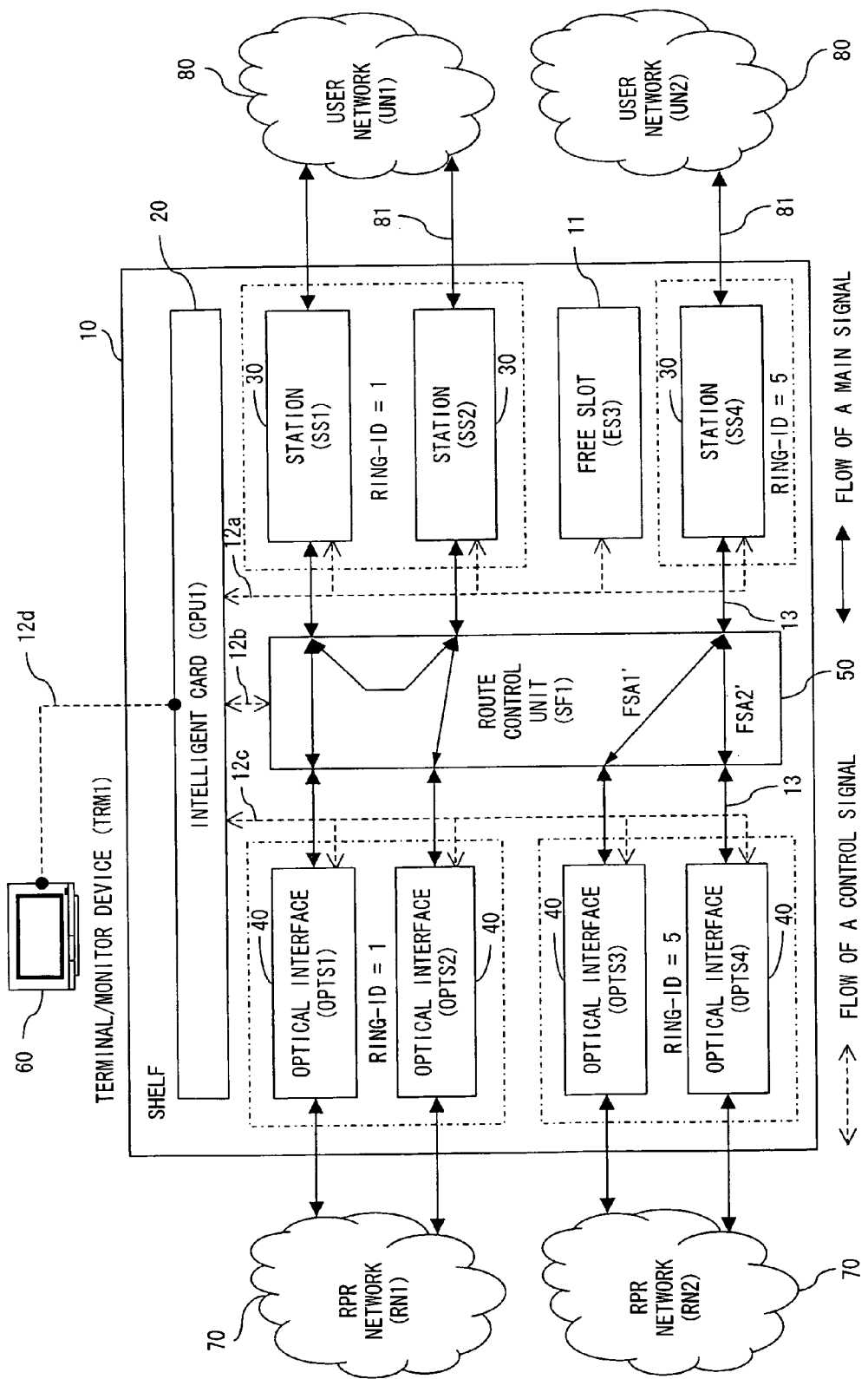
FIG. 9 shows the function of the line accommodation device in the one preferred embodiment of the present invention.

After these processes, the added station 30 transmits/receives RPR information to/from an adjacent station, using the registered RING-ID (step 112). Since in the logic of the flowchart shown in FIG. 5, the route control unit 50 simply relates the station 30 to the order of the optical interface 40, according to the disposition logic of the station 30, the logic of the flowchart is not affected by the optical interface 40 or station 30 with a different RING-ID. Therefore, as shown in FIG. 9, each station 30 can be connected to a different RPR network 70 by controlling the route control unit 50 using the intelligent card 20.

Figure 6:
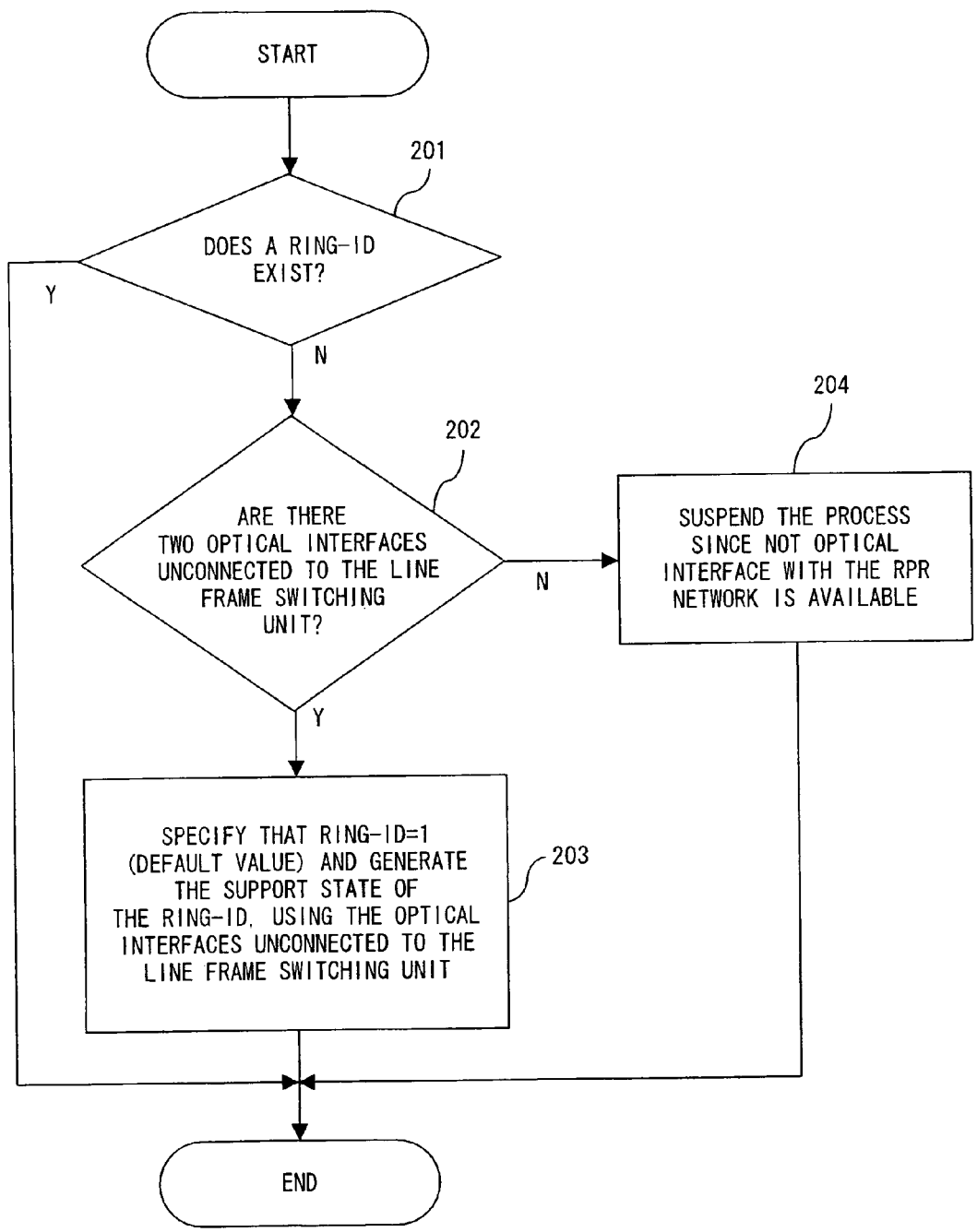
FIG. 6 shows the function of the line accommodation device in the one preferred embodiment of the present invention.

One example of the preparation process in the case where no RING-ID exists is described with reference to the flowchart shown in FIG. 6.

Firstly, it is determined whether a RING-ID exists (step 201). If it exists, the process is terminated. If in step 201 it does not exist, it is determined whether two optical interfaces 40 are not connected to the route control unit 50 (step 202). If they exist, it is specified that RING-ID=1 (default value) and the support state of the RING-ID is generated using the optical interfaces not connected to the route control unit 50 (step 203). Specifically, it is registered in the card management table 28.

If in step 202, no optical interfaces 40 unconnected to the route control unit 50 exist, the process is suspended since there are no optical interfaces to be connected to the RPR network 70 (step 204).

Figure 10:
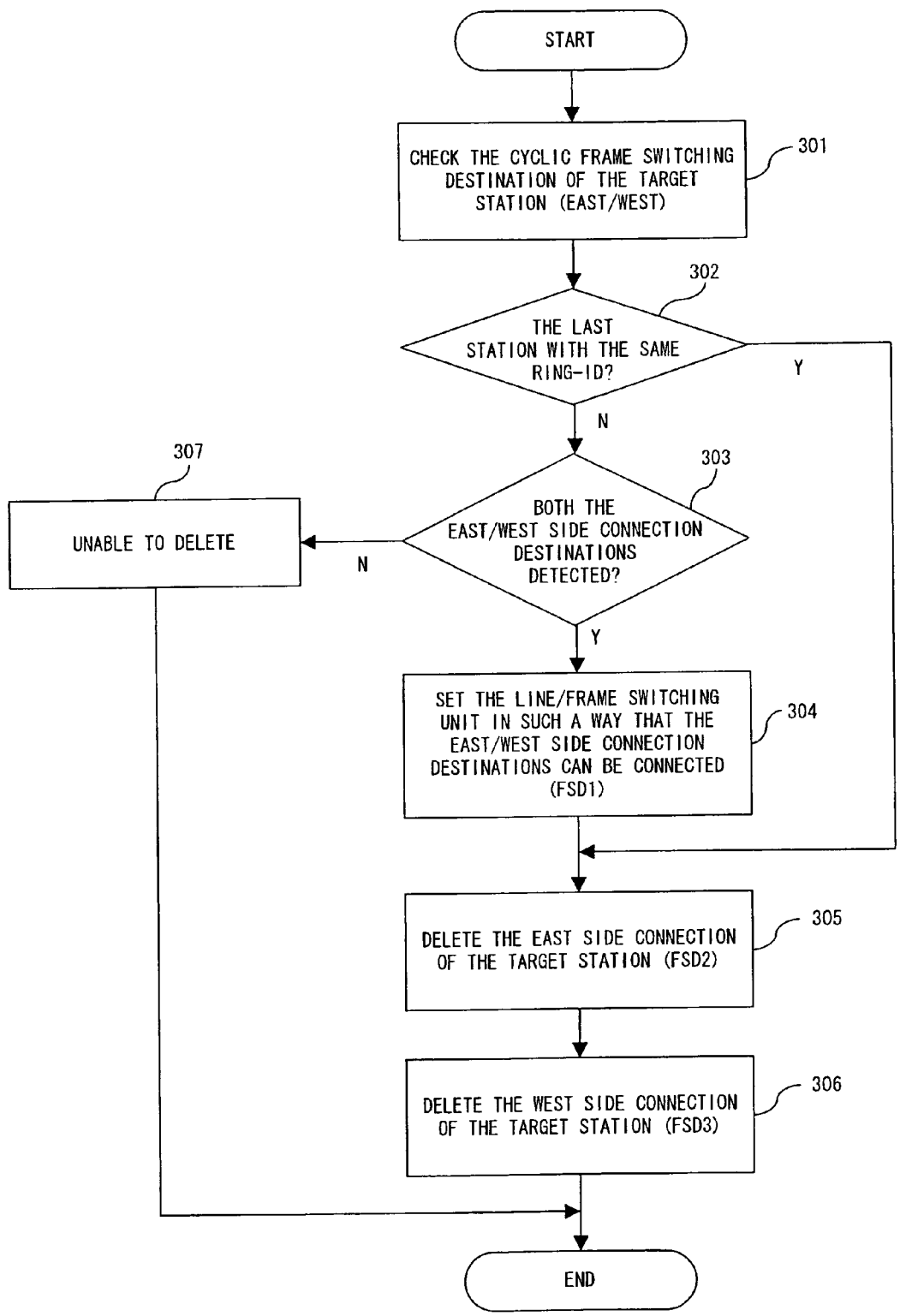
FIG. 10 shows the function of the line accommodation device in the one preferred embodiment of the present invention.

The logic for deleting a station 30 is structured as shown by the flowchart in FIG. 10. When deleting a station 30, the station 30 is disconnected from the RPR network 70 by directly connecting the east and west sides of the target station 30.

Figure 11:
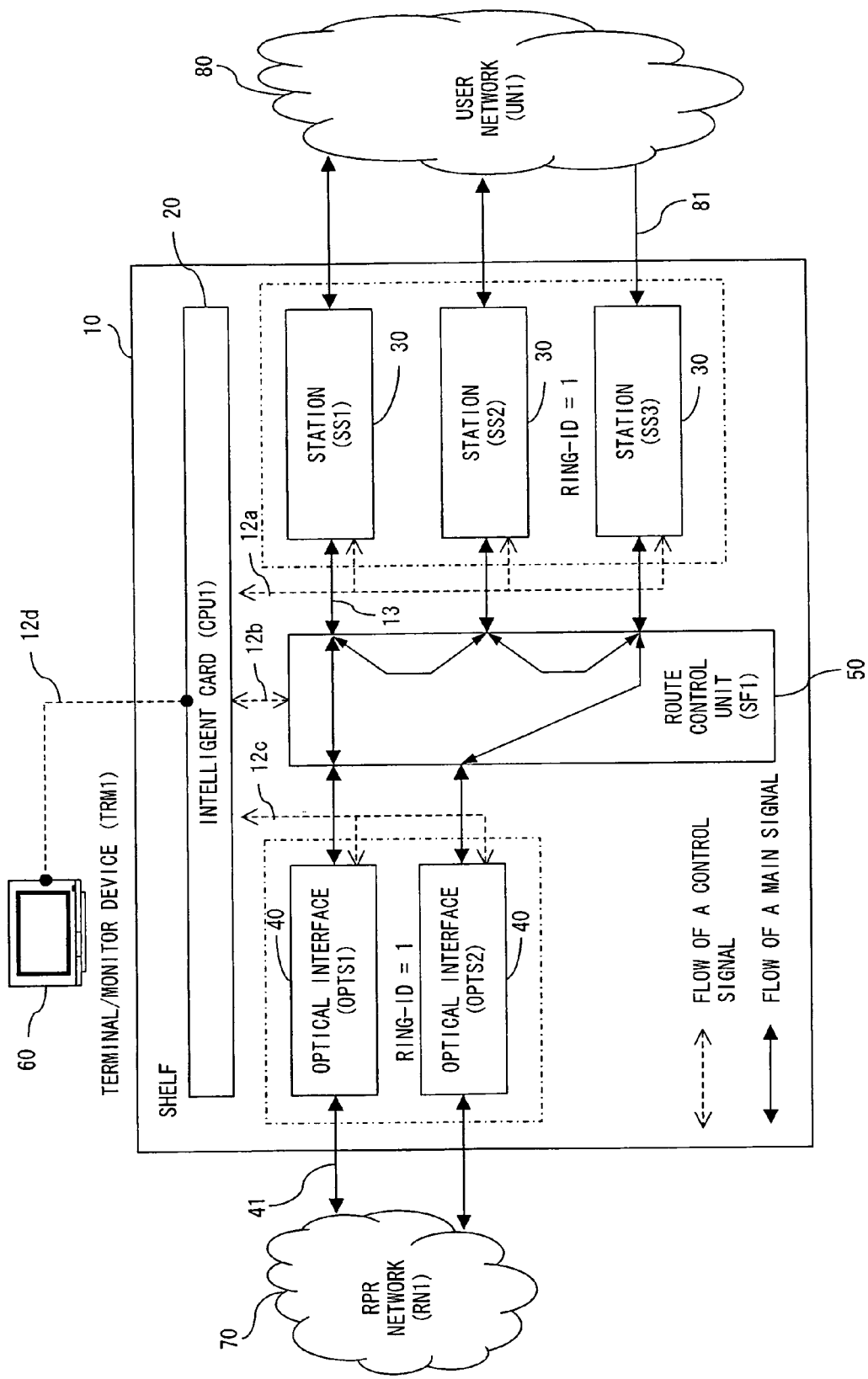
FIG. 11 shows the function of the line accommodation device in the one preferred embodiment of the present invention.
Figure 12:
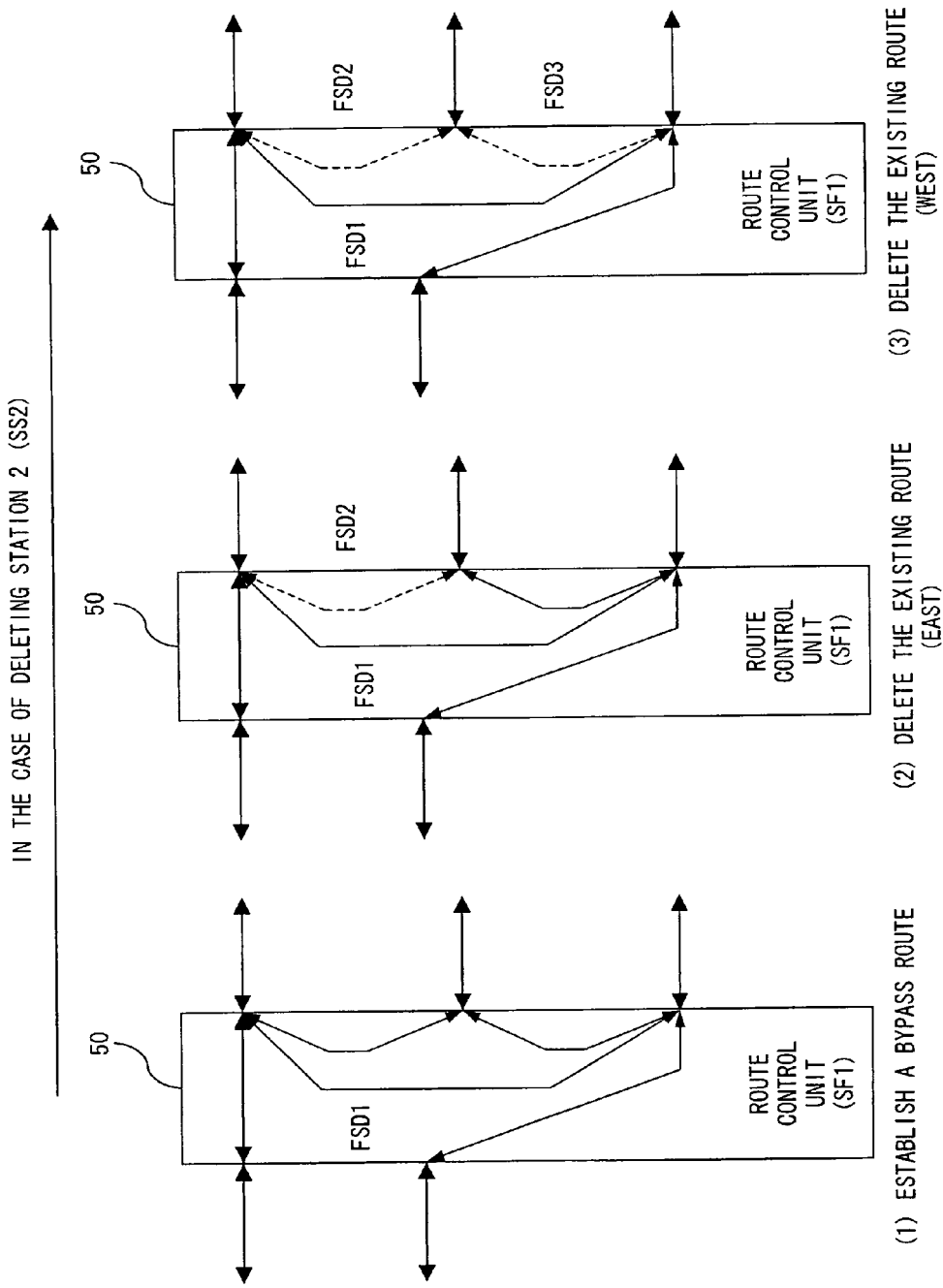
FIG. 12 shows the function of the line accommodation device in the one preferred embodiment of the present invention.
Figure 13:
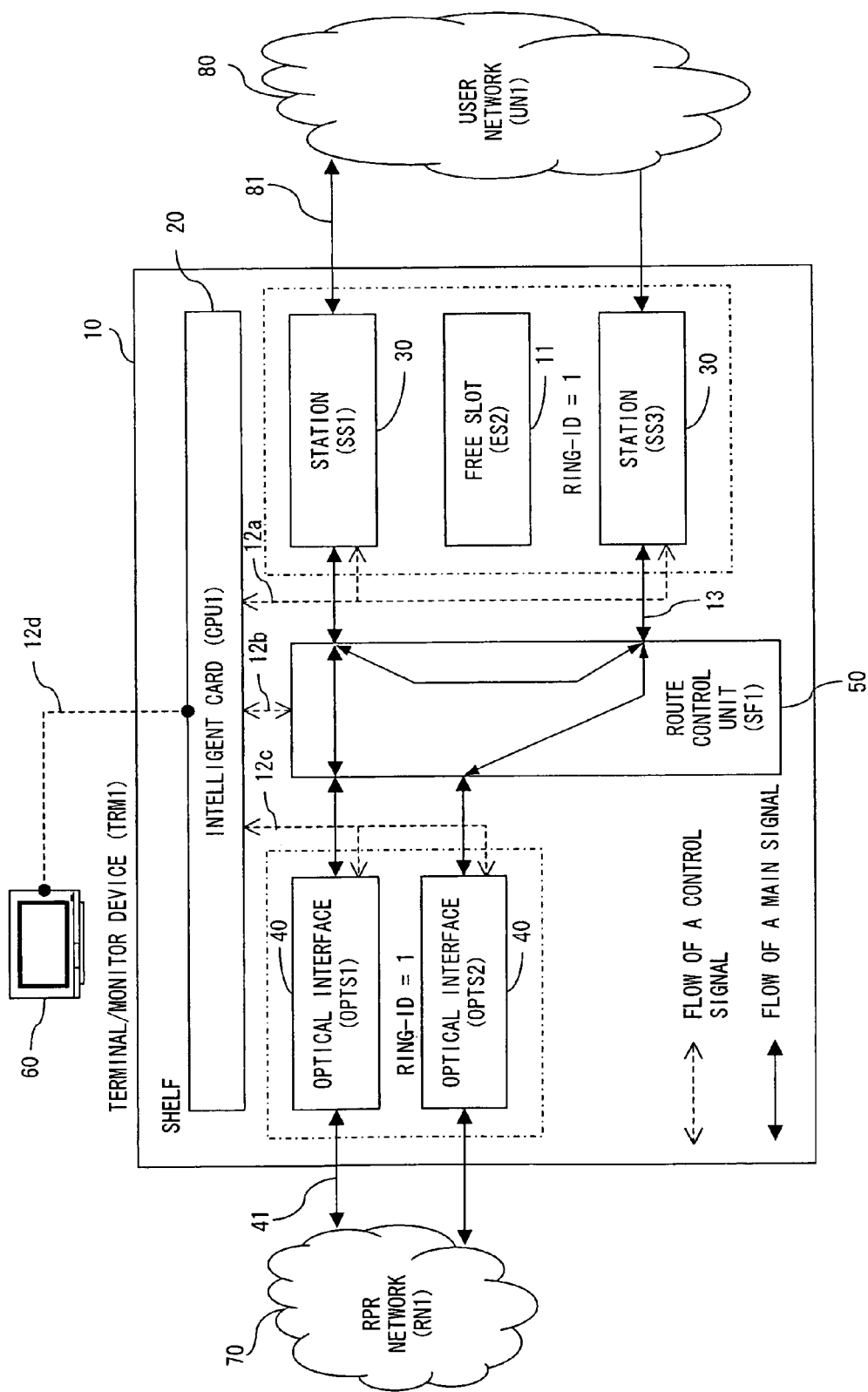
FIG. 13 shows the function of the line accommodation device in the one preferred embodiment of the present invention.

FIGS. 11, 12 and 13 show the configuration of the shelf 10 before deletion, the transition of the connection route in the route control unit 50 during the deletion process of the station 30 and the configuration of the shelf 10 after deletion, respectively.

As exemplified in FIG. 10, in the deletion process of a station 30, firstly, the switching destination of the cyclic frame of the target station is checked on each of the east and west sides (step 301).

Then, it is determined whether the target station 30 is the last station belonging to the same RPR network 70 in the shelf 10 (step 302).

If it is determined that the target station 30 is not the last station 30, it is further determined whether a connection destination exists on both of the east and west sides (step 303). If they are not detected, it is determined that the station 30 cannot be deleted (step 307).

If in the step 303, it is determined that a connection destination exists on both of the east and west sides, the connection route (FSD1 in FIG. 12) of the route control unit 50 is set in such a way that the east and west side connection destination stations 30 can be connected (step 304).

Then, the east side connection route (FSD2 in FIG. 12) of the station 30 to be deleted is deleted (step 305), and the west side connection route (FSD3 in FIG. 12) of the station 30 to be deleted is deleted (step 306).

If in step 302 the target station 30 is the last station 30, steps 305 and 306 are executed, and the east and west side connection routes are deleted.

In either adding or deleting a station 30 and in either the line switching method or frame switching method, line disconnection time can be shortened to a level meeting the requirements of the RPR network 70 (for example, within 50 milliseconds) by the control method of the route control unit described later.

Specifically, in the case of the SONET/SDH method, a line can be switched within 50 milliseconds in the route control unit 50 by configuring a "path-switch", which is described later. In the case of the frame switching method, a frame can be switched within 50 milliseconds by devising the setting of the routing table 53, as described later.

Table 1 exemplifies the combination of connection routes inside the route control unit 50 in the above-mentioned addition/deletion of a station 30.

TABLE 1

| | CONTENT OF CONTROL | AT ADDITION | AT DELETION |
|---|---|---|---|
| 1 | SET EAST SIDE OF ADDED ROUTE | FSA1, FSA1' | FSD1 |
| 2 | SET WEST SIDE OF ADDED ROUTE | FSA2, FSA2' | FSD1 |
| 3 | DELETE EAST SIDE OF EXISTING ROUTE | FSA3 | FSD2 |
| 4 | DELETE WEST SIDE OF EXISTING ROUTE | FSA4 | FSD3 |

When connecting stations 30 across a plurality of shelves 10, the Ring-ID 28b (RING-ID) is used. In this way, it can be checked whether the transmitting source of information from an adjacent shelf 10 is a station 30 with an expected RING-ID, more strictly than the existing error detection methods, such as "mis-cable", "keep-alive" or the like.

For example, it is assumed that there is an RPR network 70 accommodating six stations 30 in three shelves 10, as shown in FIG. 14. All the stations 30 in all the shelves 10 are managed on the condition of "RING-ID=1". In this case, an RPR control frame containing an RPR protocol which is transmitted/received in the optical interface 40 exists. If there is a free band in it, an IDLE-Frame exists as a frame to be compulsorily transmitted.

By embedding a Ring-ID in an IDLE-Frame transmitted/received between stations 30 or shelves 10, each station 30 or shelf 10 can know the Ring-ID of an adjacent station 30 when receiving the IDLE-Frame. If the received Ring-ID differs from the transmitting Ring-ID, an alarm is issued. Alternatively, the validity of the received data is nullified and discarded.

Figure 15:
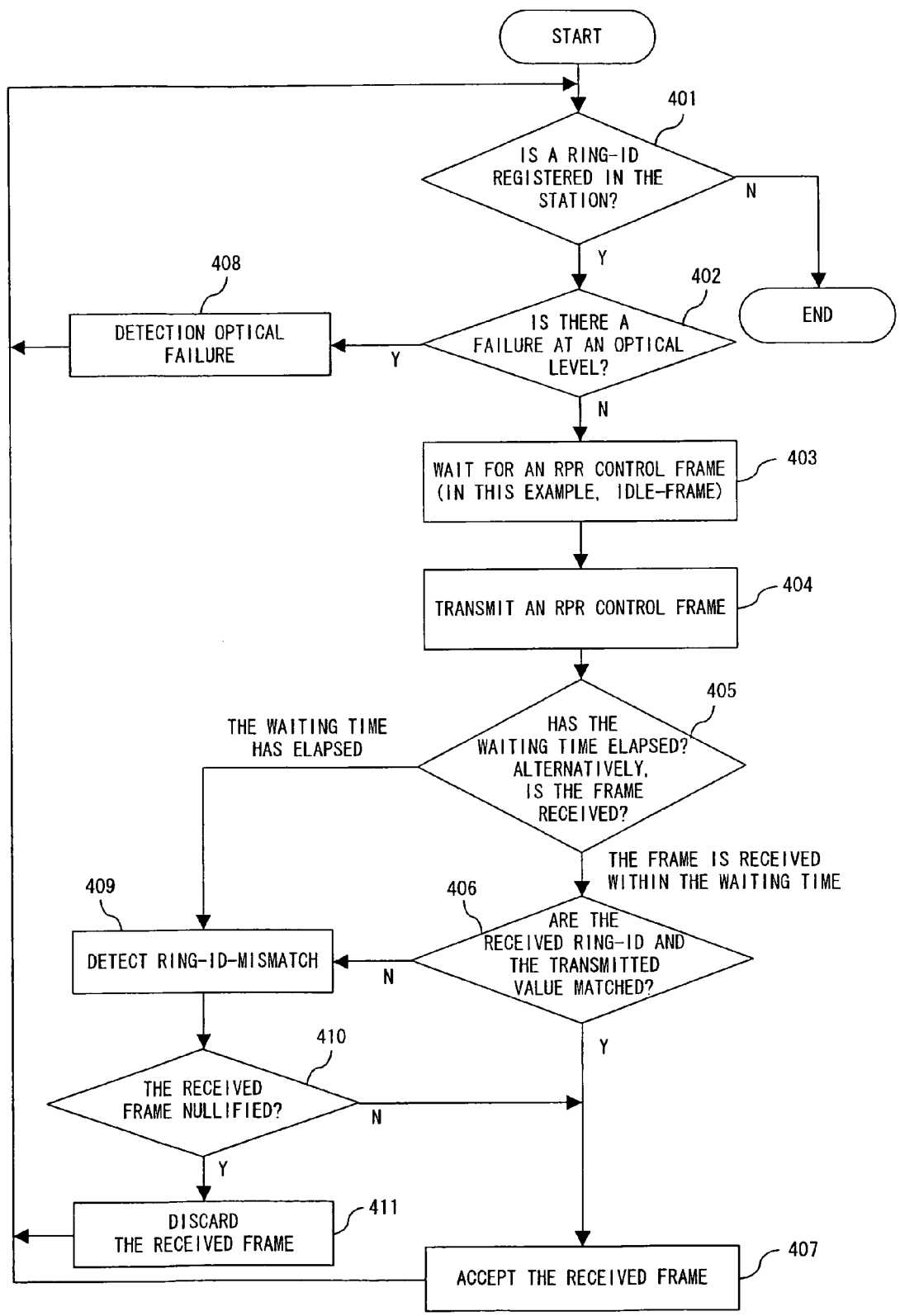
FIG. 15 is a flowchart showing the function of the line accommodation device in the one preferred embodiment of the present invention.
Figure 16:
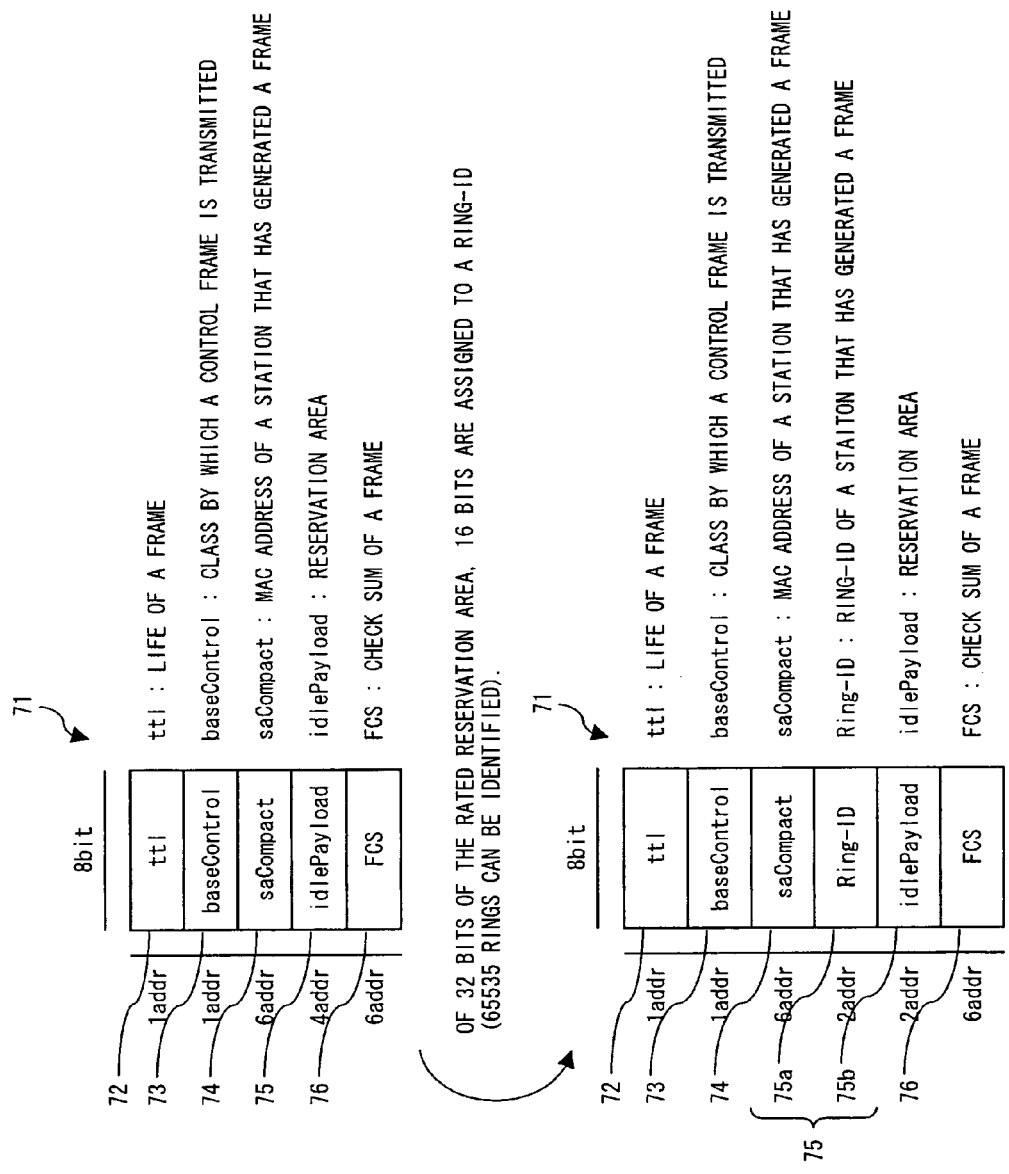
FIG. 16 shows an example of the structure of an IDLE-Frame used in the line accommodation device in the one preferred embodiment of the present invention.

FIG. 15 is a flowchart specifically exemplifying the process of each station 30 when transmitting/receiving a frame on the RPR network 70. FIG. 16 shows an example of the structure of the IDLE-frame.

As shown in the upper section of FIG. 16, an idle frame 71 rated by the RPR rating includes a frame life 72, a base control 73, a transmitting source MAC address 74, a reservation area 75 and a frame check sequence 76.

The frame life 72 is eight bits long and indicates the life of the idle frame 71 in the RPR network 70. The base control 73 is eight bits long and indicates a class by which the idle frame is transmitted. The transmitting source MAC address 74 is 48 bits long, and indicates the MAC address of the transmitting source station 30 generating the idle frame 71. The reservation area 75 is 32 bits long, is provided for future use and is usually occupied by "0" entirely.

In this preferred embodiment, as shown in the lower section of FIG. 16, a ring ID 75a is stored using the former 16 bits of this reservation area 75. The latter 16 bits are left as the remaining reservation area 75b.

As described above, in this preferred embodiment, the ring ID 75a that is stored in the idle frame 71 and is transmitted/received between stations 30 is used to determine the validity of a frame when receiving the frame.

The station 30 waits for the reception of the idle frame 71 containing the ring ID 75a for a specific period. Simultaneously, it transmits the idle frame 71 containing the ring ID 75a of an RPR network 70 to which the station 30 belongs as the transmitting side. When receiving no ring ID 75a for a specific period, like the keep-alive essential to an RPR, determines that no adjacent station 30 is seen, and detects a Ring-Id-Mismatch. When detecting no Ring-Id-Mismatch, it accepts the received frame as correct one. The behaviors of the station 30 while detecting the Ring-ID-Mismatch can be set by the intelligent card 20. In this case, one of the two operations of an operation to discard the frame and one to accept the frame can be set. The station 30 discards or accepts the frame according to the setting, and the process proceeds to a subsequent step. The monitor logic of the Ring-ID is operated as long as the station 30 belongs to the RPR network 70. When the station 30 is disconnected from the RPR network 70, the monitor logic is terminated.

Specifically, as exemplified by the flowchart in the FIG. 15, firstly, the station 30 refers to a RING-ID storage unit 39 and determines whether a Ring-ID is registered in the station 30 (step 401). If it is registered, it is determined whether there is a failure at an optical communication medium level (that is, in the SONET being a communication medium) (step 402).

If no failure is detected in an optical medium, the station 30 waits for the reception of the RPR control frame (in this preferred embodiment, idle frame 71) (step 403), and also transmits the idle frame 71 containing the ring ID 75a (step 404).

The station 30 determines whether the waiting time of the idle frame 71 has elapsed or the idle frame 71 has received (step 405). If the station 30 has received the idle frame 71 within the waiting time, it determines whether the ring ID 75a stored in the received idle frame 71 matches the transmitted value of its own station (that is, the Ring-ID 28b of the RPR network 70 to which its own station belongs) (step 406). If they are matched, the station 30 accepts the received idle frame 71 and applies a prescribed process (step 407), and the process returns to the step 401.

If in the step 405, the waiting time has elapsed, the station 30 notifies the intelligent card 20 of the detection of the RING-ID-Mismatch (step 409). Then, the station 30 determines whether the received frame should be nullified, according to an instruction from the intelligent card 20 (step 410). If it is nullified, the station 30 discards the received frame (step 411) and the process returns to the step 401. If in step 410 the received frame is validated, the process is branched into the step 407.

If in the step 402, a failure is detected in the optical medium, the station 30 notifies the intelligent card 20 of the detection of optical failure (step 408), and then the process returns to the step 401.

If a plurality of stations 30 exists in a specific Ring-ID in the same shelf 10 and if the station falls into no service-available state due to a failure, disconnection or the like, the station 30 is disconnected by controlling the route control unit 50 using the intelligent card 20. In this way, even when a failure requiring the replacement of a station 30 occurs, the failed station 30 can be disconnected. Therefore, time the RPR switching function is affected can be minimized.

Figure 17:
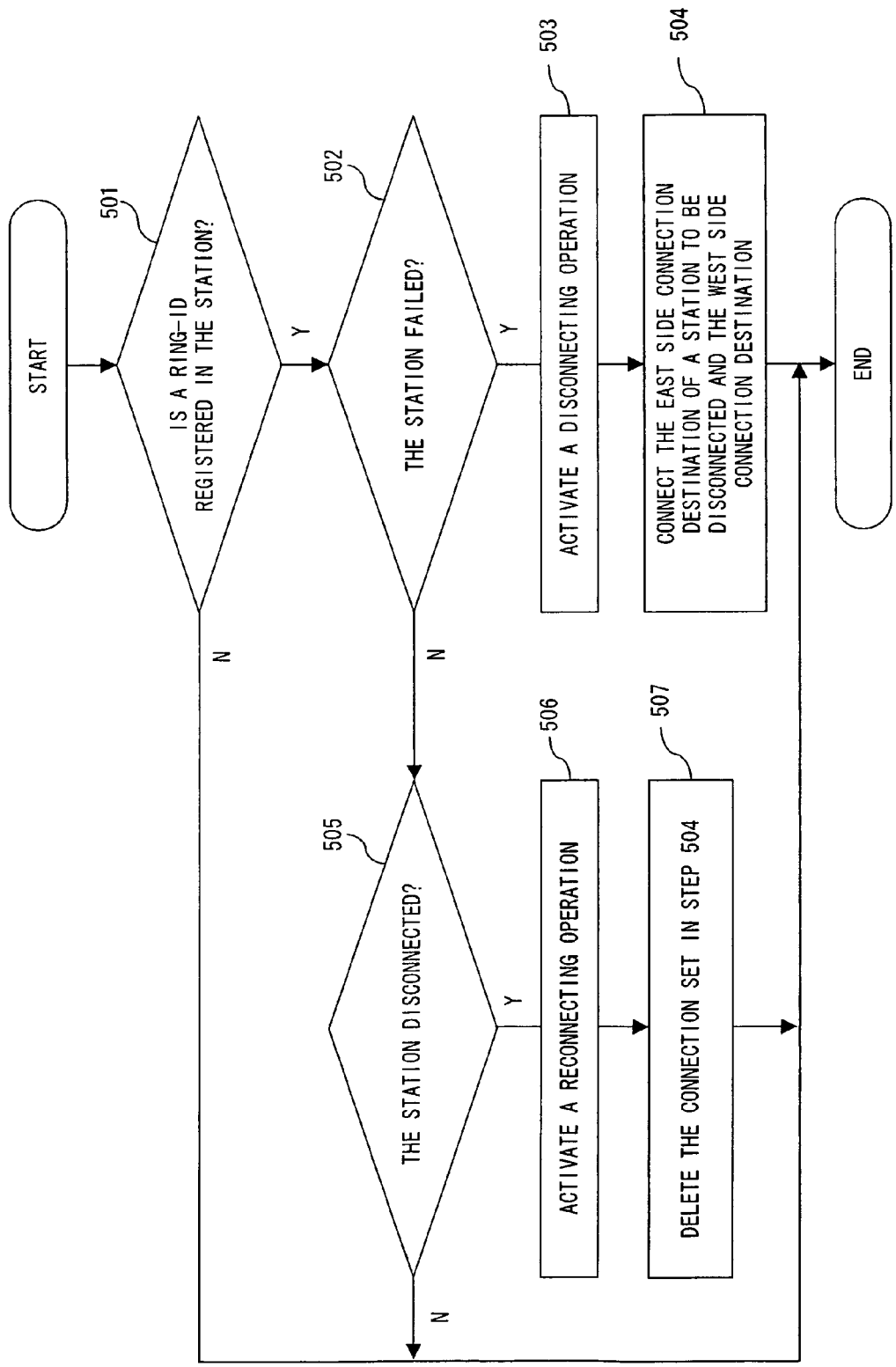
FIG. 17 is a flowchart showing the function of the line accommodation device in the one preferred embodiment of the present invention.

One specific example of the logic is shown by the flowchart in FIG. 17. The disconnecting operation can be realized by setting a connection route for bypassing a station 30 to be disconnected in the route control unit 50. This disconnection process of a station 30 is similar to that of adding/deleting a station 30. As the setting method of the bypassing connection route in the route control unit 50, in the case of the line switching method, the path-switch switching function is used. In the case of frame switching method, the switching can be realized by devising the setting information of a frame switching routing table 53.

As an example, a case where in the connecting configuration of a plurality of shelves 10 exemplified in FIG. 18, a failure occurs in a station 30 (SS21) is studied. For the reason of this failure, the station (SS21) is disconnected from the RPR network 70 in which Ring-ID=1 by controlling the route control unit 50 as shown in FIG. 19.

Specifically, as exemplified by the flowchart in FIG. 17, firstly, it is determined whether a Ring ID is registered in the station 30 (step 501). If it is registered, it is determined whether a failure occurs in the station 30 (step 502).

If a failure occurs in the station 30, a disconnecting operation is activated (step 503), and the east side connection destination and west side connection destination of the station 30 to be disconnected are connected (step 504).

If in the step 502, no failure occurs in the station 30, it is determined whether the station 30 is disconnected (step 505). If the station 30 is disconnected, a reconnecting operation is activated (step 506), and the connection set in step 504 is deleted (step 507).

Figure 20A:
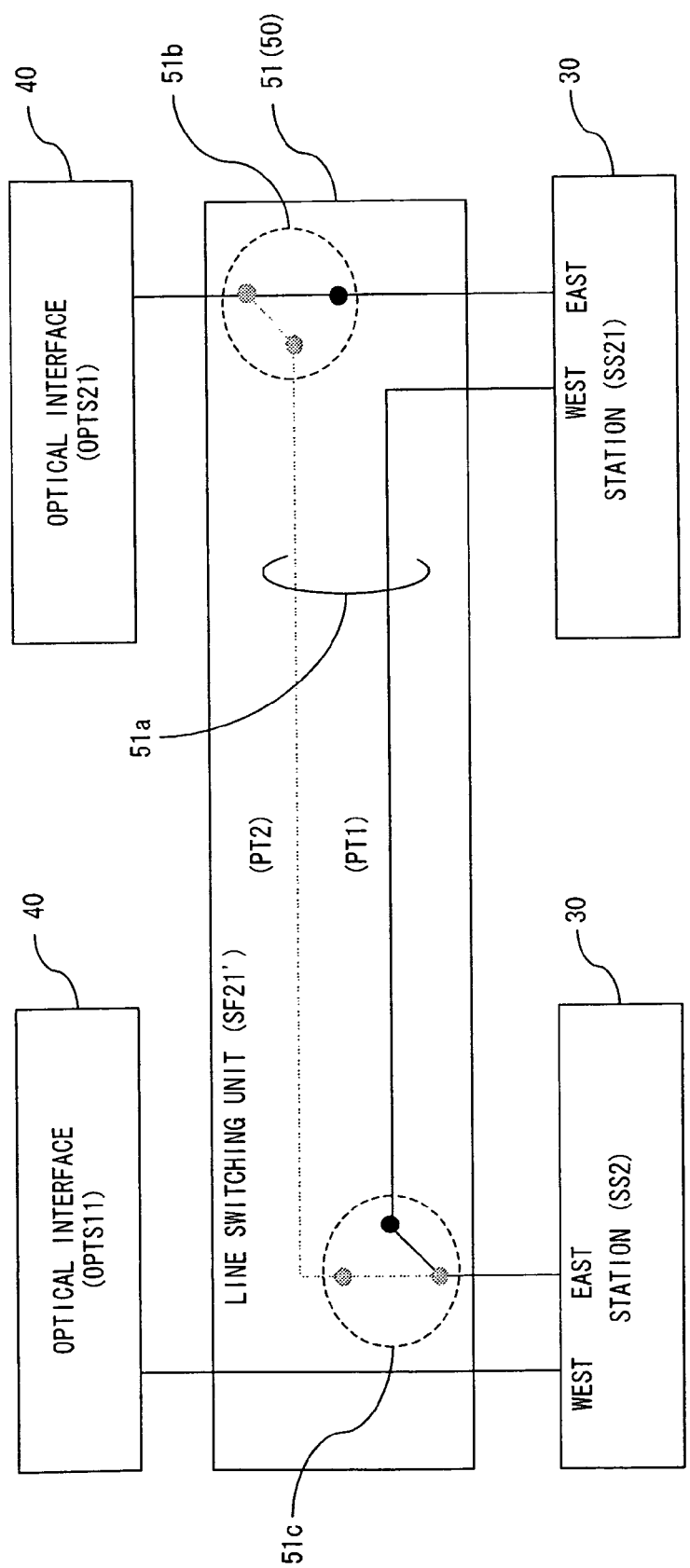
FIG. 20A shows the route control process by the line switching method in the line accommodation device in the one preferred embodiment of the present invention.
Figure 20B:
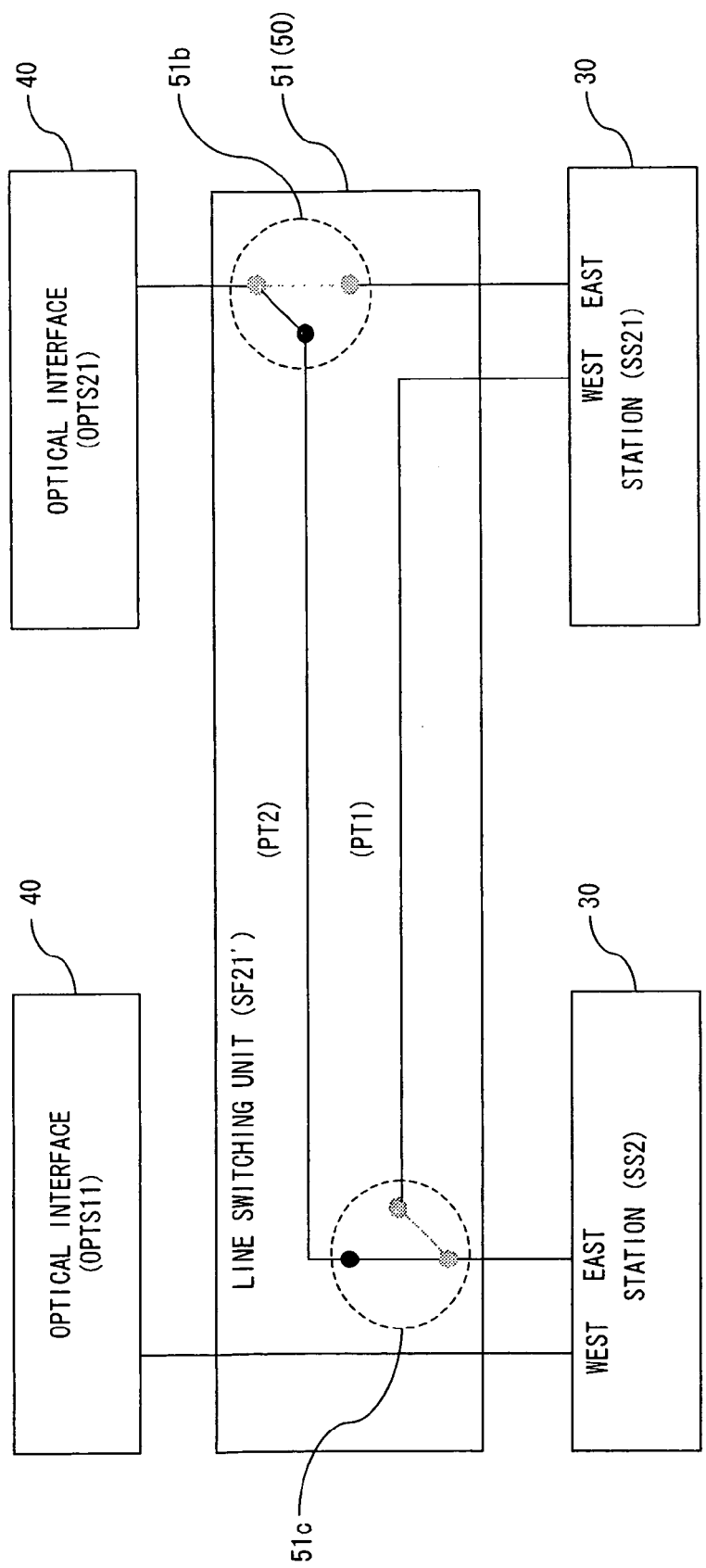
FIG. 20B shows the route control process by the line switching method in the line accommodation device in the one preferred embodiment of the present invention.
Figure 20C:
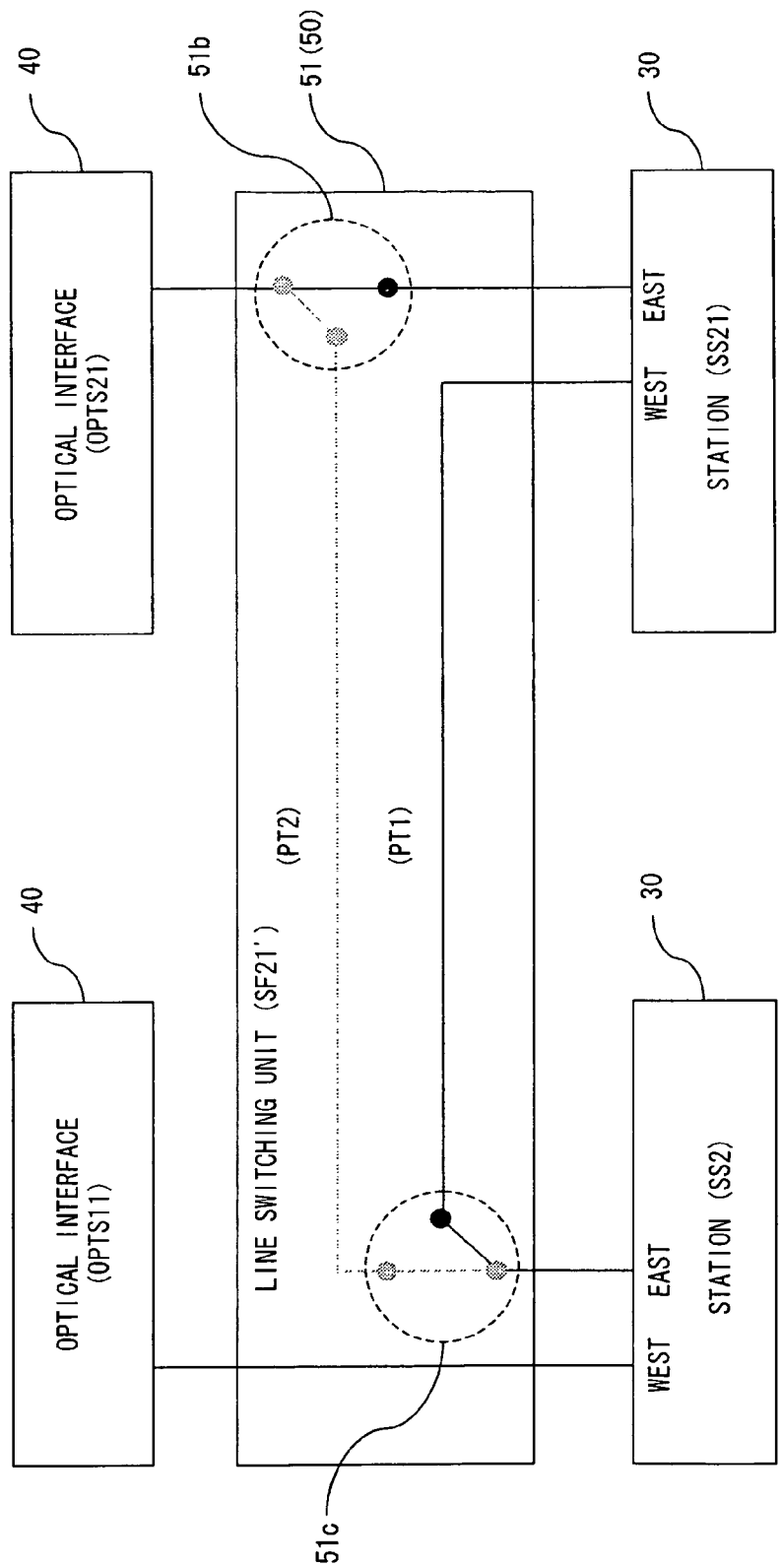
FIG. 20C shows the route control process by the line switching method in the line accommodation device in the one preferred embodiment of the present invention.

Next, referring FIG. 20A through 20C, a case where a connection is modified by SONET/SDH line switching is studied. In the case of the line switching method, the route control unit 50 comprises a line switching unit 51 as a route control function. This line switching unit 51 comprises a path 51a and a path-switch function composed of path switching units 51b and 51c for instantaneously switching this path 51a.

Signals passes through a route indicated by a line (PT1) before disconnection, as shown in FIG. 20A. In order to disconnect the station 30 (SS21) in this state, as shown in FIG. 20B, a line (PT2) is newly established. Then, the line (PT1) is switched to the line (PT2). In this way, the station 30 (SS21) is disconnected.

If the station 30 (SS21) is recovered from the failure by substrate replacement or the like, as shown in FIG. 20C, the original route using the line (PT1) is restored by connecting back the path switching units 51b and 51c to the line (PT1) switched and unused without being deleted.

Figure 21:
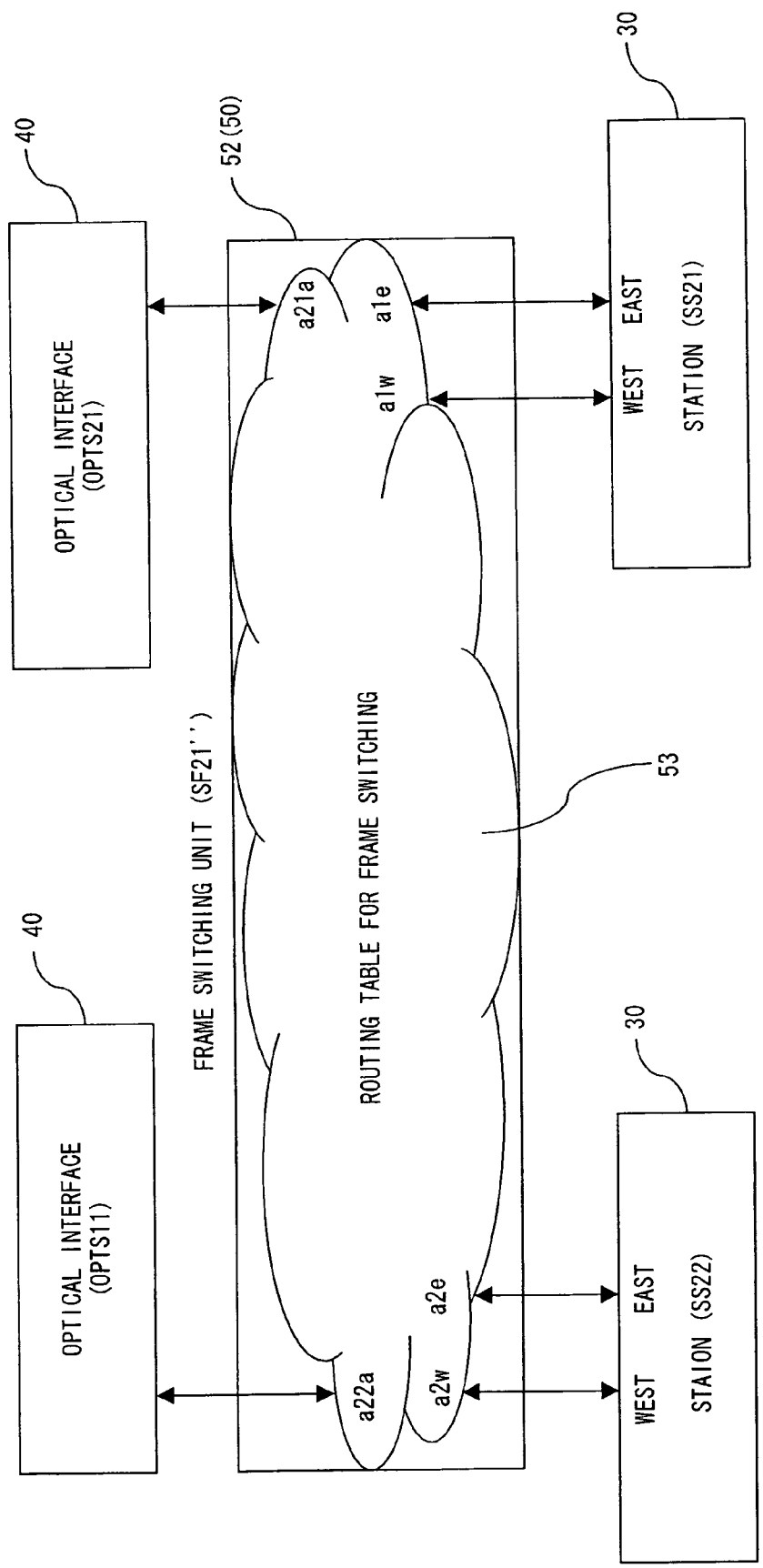
FIG. 21 shows the route control process by the line switching method in the line accommodation device in the one preferred embodiment of the present invention.

However, if the connection between the station 30 and the optical interface 40 is modified by frame switching in the route control unit 50, as shown in FIG. 21, the route control unit 50 comprises a frame switching unit 52. This frame switching unit 52 comprises a plurality of connection ports to each of which the station 30 and the optical interface 40 are connected, which is not shown in FIG. 21. Using the routing table 53 exemplified in FIG. 22A, a connection route set between the connection ports is controlled. Specifically, in the routing table 53, a transmitting source address 53a and a destination address 53b are set for each connection route.

The transmitting source address 53a indicates the address of the connection port of the frame switching unit 52 to which the transmitting source station 30 or optical interface 40 is connected.

The destination address 53b indicates the address of the connection port of the frame switching unit 52 to which the destination station 30 or optical interface 40 is connected.

Furthermore, in this preferred embodiment, a freeze flag 53c is set for each connection route defined by the routing table 53.

This freeze flag 53c is set to prevent the route from being forgot from the routing table 53 while bypassing a specific route (connection route) when controlling the route using the routing table 53. Specifically, "YES" and "NO" are set in the table entry of a route that must be restored and those other than the route, respectively.

In the initial setting state shown in FIG. 22A, in the frame switching unit 52, a connection port (a22a) to which OPTS22 is connected and a connection port (a2w) to which the west side of SS22 is connected are bi-directionally connected. A connection port (a2e) to which the east side of SS22 is connected and a connection port (a1w) on the west side of SS21 are bi-directionally connected. A connection port (a21a) to which OPTS21 is connected and a connection port (a1e) to which the west side of SS22 is connected are bi-directionally connected.

In this way, a plurality of SS22 and SS21 are connected to OPTS22 and OPTS21, respectively, in a loop. If in the normal state set as shown in FIG. 22A, one station 30 (SS21) is disconnected, as shown in FIG. 22B, a bypassing route for bi-directionally connecting the connection ports (a21a) and (a2e) is newly established in the routing table 53, and a freeze flag 53c (in this case, "YES") is set in a table entry corresponding to the old bypassed route.

When the station 30 (SS21) is restored, as shown in FIG. 22C, the table entry added for bypassing is deleted from the routing table 53 and the setting of the freeze flag 53c of the table entry in the old route is released ("NO"), thereby restoring the station 30 (SS21) to a normal state.

Even when the station 30 (SS21) is being disconnected, the intelligent card 20 can uniquely calculate how he connection route should be modified in the route control unit 50 when disconnecting it since for a rule on the positional relationship (such as clockwise disposition, etc.) among stations 30 in the RPR network 70 is determined.

Even if a part of the stations 30 is disconnected from the RPR network 70, the ring state of the transmission line of the RPR network 70 is maintained. Therefore, although remedies by the anti-failure function of the RPR itself is temporarily applied while being disconnected, the remedies of the RPR itself are released when the RPR network 70 is restored to a ring state.

Therefore, when a multi-failure occurs, firstly countermeasures, such as the disconnection of the station 30 by the route control of the route control unit 50 functions. If a failure further occurs in the station 30 or the like in that state, the essential failure countermeasures of the RPR function. As a result, tolerance to a multi-failure can be improved compared with the prior art.

As a factor for disconnecting the station 30, the failure of a circuit substrate constituting the station 30 (including keep-alive failure), the falling of the station 30 off the slot 11, the occurrence of Ring ID-Mismatch or the like can be considered.

As described above, according to this preferred embodiment, if a plurality of stations belonging to the same or different RPR networks 70 is installed in a shelf 10, a station 30 added/deleted to/from the shelf can be automatically registered/deleted, respectively, in/from an RPR network 70.

Even if a plurality of shelves 10 each provided with a plurality of stations 30 is connected to the RPR network 70, accurate communication without interference among different RPR networks 70 can be realized by applying appropriate anti-error measures, such as the issuance of an alarm for a mis-connection or the like when connecting a station 30 to a wrong RPR network 70, using a Ring-ID set in the RING-ID storage unit 39 of the station 30, from the intelligent card 20.

Furthermore, since the intelligent card 20 monitors the operating condition of the station 30 and optical interface 40, the intelligent card 20 can automatically disconnect the station 30 by controlling the route control unit 50 if the station 30 must be disconnected from the RPR network 70 for the reason of the failure of the station 30 or the like. If the failure of the station 30 is recovered by replacing a circuit substrate constituting the station 30 or the like, the station 30 can be automatically restored to its original state by controlling the route control unit 50.

According to the present invention, the second communication control means can be accurately added/deleted to/from a line accommodation device for accommodating the second communication control means connected to the second communication system using the first communication system as a medium.

In a line accommodation device for accommodating the second communication control means connected to the second communication system using the first communication system as a medium, the accurate communicating operation of a plurality of the second communication control means belonging to each of a plurality of the second communication systems can be assured.

In a line accommodation device for accommodating the second communication control means connected to the second communication system using the first communication system as a medium, anti-failure measures can be applied to the second communication control means connected to the second communication system, without degrading the anti-failure performance of the second communication system.

The application of the present invention is not limited to the above-mentioned preferred embodiments, and the present invention can also variably modified as long as the subject matter of the present invention is not deviated.

What is claimed is:

1. A line accommodation device, comprising:
at least one first communication controller to control information transmission and reception to and from a first communication system, such as at least one of a synchronous optical network, a synchronous digital hierarchy and a wavelength division multiplexing;
at least one second communication controller such as resilient packet ring station, to control the transmission and reception of information to or from a second communication system such as a resilient packet ring network using the first communication system as a communication medium; and
route controller to control the switching of an information transfer route between the first communication controller and the second communication controller, wherein
a plurality of the second communication systems are built on the first communication system and a plurality of said second communication controller belonging to the same or different second communication systems is installed in each of the line accommodation device,
each of said second communication controllers comprises a memory to store identifying information attached to each of the second communication systems, and control logic to identify the second communication system, using the identifying information, and
said route controller switches the information transfer route by adding a new second communication controller between said first communication controller, and disconnecting said second communication controller which formed the information transfer route between said first communication controller, wherein said new second communication controller is different from the second communication controller which formed the information transfer route with the first communication controller.

2. The line accommodation device according to claim 1, further comprising a slot to or from which a plurality of the first and second communication controller is attached or detached, wherein said route controller controls the switching of the information transfer route by line switching or packet switching, between a plurality of said first communication controller and a plurality of said second communication controller, which are installed in the slot.

3. The line accommodation device according to claim 1, wherein the memories store the identifying information of the second communication system belonging to the relevant second communication controller, and the control logic is configured to determine the adding position in the relevant second communication system when adding said second communication controller to the second communication system.

4. The line accommodation device according to claim 1, further comprising configuration controller to control said route controller and said first and second communication controller, the configuration controller comprising control logic to re-build a connection relationship between said first and second communication controller, using said route controller when adding or disconnecting at least one of said first and second communication controller to or from the line accommodation device.

5. The line accommodation device according to claim 1, wherein said route controller comprises a line switching function to control a route between said first and second communication controller, said first communication controller comprises a path switching function to switch a connection route of a line set inside said route controller, and when adding or disconnecting said first and/or second communication controller to or from the line accommodation device, a connection route between said first and second communication controller is modified using the path switching function.

6. The line accommodation device according to claim 1, wherein said route controller comprises a frame switching function to control a route between said first and second communication controller, said route controller comprises a route control table in which transfer route information for defining a transfer route of a frame transmitted and received between said first and second communication controller and valid/invalid information indicating whether the transfer route information is valid, and when adding or disconnecting said first and/or second communication controller to or from the line accommodation device, a connection route between said first and second communication unit is modified by updating the route control table.

7. The line accommodation device according to claim 1, further comprising configuration controller to control said route controller and said first and second communication controller, the configuration controller comprises installing position determining logic to determine a connection order in the second communication system of a plurality of said second communication controller installed in the line accommodation device and when adding or disconnecting said second communication controller to or from the line accommodation device, the connection order is determined based on the installing position determining logic.

8. The line accommodation device according to claim 1, further comprising configuration controller to control said route controller and said first and second communication controller, the configuration controller comprises a function to notify an external management terminal device of an operating condition of said first and second communication controller and said route controller.

9. The line accommodation device according to claim 1, wherein the second communication system is a resilient packet ring (RPR) used for a pair of ring-shaped transmission lines in which information transfer directions are opposite, and said second communication controller provided for each of a plurality of the line accommodation devices connected to the first communication system constitutes an RPR station to control the transmission and reception of information between the RPR and a third communication system.

10. The line accommodation device according to claim 1, wherein the second communication system is a resilient packet ring (RPR) used for a pair of ring-shaped transmission lines whose information transfer directions are opposite, and said second communication controller comprises unit to store ring identifying information of each the second communication systems in a part of an RPR frame of the RPR and determination unit to collate the ring identifying information of the second communication system to which the station belongs with the ring identifying information stored in the RPR frame transmitted from another said second communication controller, determining the validity of the RPR frame and instantaneously disconnecting communication or issuing an error alarm.

11. The line accommodation device according to claim 1, further comprising configuration controller to control said route controller and said first and second communication controller, the configuration controller comprises control logic o disconnect failed said first and/or second communication controller from the first and/or second communication systems by controlling said route controller, using failure detection of said first and/or second communication controller as a trigger.

12. A control method of a line accommodation device which comprises a first communication controller to control information transmission and reception to and from a first communication system, such as at least one of a synchronous optical network, a synchronous digital hierarchy and a wavelength division multiplexing, and a second communication controller such as resilient packet ring station, to control information transmission and reception to and from second communication systems such as resilient packet ring networks using the first communication system as a communication medium, comprising:
- building the second communication system by connecting the first communication controller and the second communication controller via a route controller for controlling switching of an information transfer route between the relevant first communication controller and the second communication controller; and
- modifying the information transfer route when extending or removing the first and/or second communication controller, wherein the second communication systems are built on the first communication system and a plurality of said second communication controller belonging to the same or different second communication systems is installed in each of the line accommodation device, each of said second communication controller comprises a memory to store identifying information attached to each of the second communication system and control logic to identifying the second communication system, using the identifying information, and said route controller switches the information transfer route by adding a new second communication controller between said first communication controller, and disconnecting said second communication controller which formed the information transfer route between said first communication controller, wherein said new second communication controller is different from the second communication controller which formed the information transfer route with the first communication controller.

13. The control method of a line accommodation device according to claim 12, wherein when installing the plurality of said second communication controller belonging to each of the plurality of the second communication system in the first step, information for identifying each of the second communication systems is stored in each of the second communication controller, and each of the second communication controller identifies each of the second communication systems by attaching the identifying information to communicating information transmitted to the second communication system and detecting the identifying information attached to the communicating information.

14. A control method of a configuration controller of a line accommodation device which comprises a first communication controller to control information transmission and reception to and from a first communication system, such as at least one of a synchronous optical network, a synchronous digital hierarchy and a wavelength division multiplexing, a second communication controller such as resilient packet ring station, to control information transmission and reception to and from second communication systems such as resilient packet ring networks using the first communication system as a communication medium and a route controller to control switching of an information transfer route between the first and second communication controller, comprising:
- enabling the route controller to set the information transfer route for bypassing failed second communication controller when the second communication controller fails or disconnecting failed second communication controller from the line accommodation device; and
- determining the adding position of the second communication controller in the relevant second communication system when adding the second communication controller to an arbitrary second communication system in order to build a plurality of the second communication systems on the first communication system, wherein a plurality of said second communication controller belonging to the same or different second communication systems is installed in each of the line accommodation device, each of said second communication controller comprises a memory to store identifying information attached to each of the second communication systems and control logic to identify the second communication systems, using the identifying information, and said route controller switches the information transfer route by adding a new second communication controller between said first communication controller, and disconnecting said second communication controller which formed the information transfer route between said first communication controller, wherein said new second communication controller is different from the second communication controller which formed the information transfer route with the first communication controller.

* * * * *